(12) United States Patent
Slobodin et al.

(10) Patent No.: US 7,237,004 B2
(45) Date of Patent: Jun. 26, 2007

(54) DATACONFERENCING APPLIANCE AND SYSTEM

(75) Inventors: David E. Slobodin, Lake Oswego, OR (US); René Poston, Portland, OR (US); Jeff Glickman, Las Vegas, NV (US)

(73) Assignee: InFocus Corporation, Wilsonville, OR (US)

( * ) Notice: Subject to any disclaimer, the term of this patent is extended or adjusted under 35 U.S.C. 154(b) by 691 days.

(21) Appl. No.: 10/043,626

(22) Filed: Jan. 8, 2002

(65) Prior Publication Data
US 2003/0072429 A1 Apr. 17, 2003

Related U.S. Application Data

(60) Provisional application No. 60/330,253, filed on Oct. 17, 2001.

(51) Int. Cl.
*G06F 15/16* (2006.01)
*H04L 12/16* (2006.01)

(52) U.S. Cl. ...... 709/204; 709/205; 709/206; 370/260; 370/261; 370/537; 370/538

(58) Field of Classification Search ........ 709/204–206; 370/260, 338; 382/251–253; 379/202.01
See application file for complete search history.

(56) References Cited

U.S. PATENT DOCUMENTS

| 5,916,302 | A | 6/1999 | Dunn et al. ........... 709/204 |
| 6,091,857 | A * | 7/2000 | Shaw et al. ........... 382/251 |
| 6,233,605 | B1 | 5/2001 | Watson ............... 709/204 |
| 6,237,025 | B1 | 5/2001 | Ludwig et al. ......... 709/204 |
| 6,381,343 | B1 * | 4/2002 | Davis et al. .......... 382/112 |
| 6,671,262 | B1 * | 12/2003 | Kung et al. ........... 370/260 |
| 6,807,564 | B1 * | 10/2004 | Zellner et al. ......... 709/206 |
| 6,826,173 | B1 * | 11/2004 | Kung et al. ........... 370/352 |
| 6,831,899 | B1 * | 12/2004 | Roy ................. 370/260 |
| 6,907,034 | B1 | 6/2005 | Begis |
| 6,985,589 | B2 | 1/2006 | Morley |
| 2002/0175915 | A1 | 11/2002 | Lichtfuss |

OTHER PUBLICATIONS

Thom Bryant, *IP Multicast: Something for Everyone*, Packet Magazine, Oct. 1999, http://www.cisco.com/warp/public/784/packet/oct99/ipmultiast,html, visited Dec. 7, 2001.

(Continued)

*Primary Examiner*—David Wiley
*Assistant Examiner*—Jude J. Jean-Gilles
(74) *Attorney, Agent, or Firm*—Schwabe Williamson & Wyatt

(57) ABSTRACT

Geographically distributed conference sites each have a telephone receiver and a dataconferencing appliance connected to a shared voice call network. Each site also has a display device for displaying images comprised of image data produced by an image source. The dataconferencing appliance is connected to a data network that links the sites independently of the voice call network. To initiate a dataconference session between the sites, a voice call session is first established between the telephone receivers via the voice call network. An address negotiation procedure implemented in software or hardware of the dataconferencing appliance is then manually initiated to identify a network access code and communicate it to at least a second one of the sites within the voice call session. The network access code is used to establish a data communication session via the data network for convenient transmission of image data between the sites.

48 Claims, 11 Drawing Sheets

OTHER PUBLICATIONS

Carolyn Duffy Marsan, *Vendors Move to Bridge Web and Phone Network*, Network World Fusion Magazine, Jul. 2001, http://www.nwfusion.com/cgi-bin/mailto/x.cgi, visited Nov. 14, 2001.

Sprint ICCC, *Sprint Internet Collaboration Center*, 1999, http://www.sprintconf.com, visited Oct. 29, 2001.

C. Bisdikain et al., *Multimedia Digital Conferencing: A web-enabled Multimedia Teleconferencing System*, IBM Journal of Research and Development, vol. 42, No. 2, 1998.

*Internet Protocol (IP) Multicast*, Cisco Systems, Inc., 2000.

Tandberg, Inc., Tandberg 8000—Boardroom and Beyond, http://www/tandbergusa.com/produkter/tb$_{13}$ 8000.html, visited Feb 1, 2002.

Tandberg, Inc., Tandberg 8000 product specifications, Oct. 2001.

Tandber, Inc., Making it Easy to Get Together—Frequently Asked Questions about Tandberg's built-in MultiMultiSite Feb. 2002.

\* cited by examiner

DATACONFERENCING APPLIANCE AND SYSTEM

RELATED APPLICATIONS

This application claims the benefit under 35 U.S.C. § 119(e) of U.S. Provisional Patent Application No. 60/330,253, filed Oct. 17, 2001, which is incorporated herein by reference.

TECHNICAL FIELD

This invention relates to multimedia teleconferencing methods and devices and, in particular, to devices and systems for establishing dataconferencing sessions between two or more geographically remote conference sites using distributed control.

BACKGROUND OF THE INVENTION

It is currently time-consuming, difficult, and expensive to set up a combined audio and visual presentation conference between remotely located conference sites. One known approach is videoconferencing, which involves two or more videoconference devices of the type sold by PictureTel Corporation of Andover, Mass., USA. Such devices are expensive and optimized to support full-motion person-to-person video. They use expensive ISDN lines for communication, which adds to the total solution cost and hinders mobility of the system. Videoconference devices also typically have dedicated telephone numbers that may be unlisted or difficult to determine, thereby complicating videoconference setup. In many instances, full-motion video is unnecessary for an effective conference. Often a simple telephone conference and shared presentation images are all that is required.

A common practice among presenters is to display computer-generated visual aids or images. Videoconferencing systems typically do not provide convenient tabletop connectivity for integrating presentation images with the video transmission. Rather, it may be necessary to adjust the videoconferencing system so that its video camera is aimed toward a screen where presentation images are displayed, e.g., via a computer display or multimedia projector.

It is also known to use both a telephone and a computer for sharing presentation materials between a local site and a remote site over a computer network concurrently with an audio telephone conference. In known methods, separate connections are established manually for the voice call (via the telephone network) and for the data or images (via the computer network). The telephone number of the remote site is first dialed on a speakerphone at the local site to establish the audio connection. Then, to establish the shared presentation connection, the user at the local site must locate the Internet Protocol address ("IP address") of the remote computer and establish a data network connection. While ordinary telephone numbers are typically easily located or communicated to a remote party, IP addresses are often unknown, can change frequently, and are difficult to obtain. IP addresses may also be dynamically allocated to computers within a network domain or corporate subnet via Dynamic Host Configuration Protocol ("DHCP") and may be valid only within the domain or corporate subnet and not directly addressable from outside of it, due to the use of proxy servers or network address translation (NAT) service. Data network connections for shared presentations are typically blocked by firewalls when sending data or images over the Internet, unless the firewall has been specially configured. Thus there exists a need for improved methods and devices for establishing dataconferencing sessions.

Other dataconferencing systems use a centralized computer server to set up and manage the audio and data connections. For example, U.S. Pat. No. 5,916,302 of Dunn et al. describes using a Public Switched Telephone Network ("PSTN") for the audio component of a dataconference and a centralized server computer accessible via a computer network for distributing the video or image component of the dataconference. Participants using the Dunn et al. system access the server computer to download images using Web browser software of a personal computer. The network address or Internet domain name of the server computer must be communicated to all participants and manually input into the Web browser by each participant to upload or access the image component of the dataconference. Manual input of the server's network address is tedious, subject to typographical errors, and difficult to coordinate for multiple conference participants. This method also leaves residual images on the central server computer and the computers of each participant after completion of the dataconference, which may be undesirable.

U.S. Pat. No. 6,233,605 of Watson describes a low-bandwidth remote conferencing system that uses a PSTN for the audio component and networked computers for the visual component. Before a conference, data representing visual images is distributed to computers of conference participants. During the conference, one participant, a leader, periodically issues selection signals to all computers, causing them all to select one of the distributed images and display it. The selection signals and the telephone conference are carried by a single voice-grade telephone channel. The system requires distribution of the presentation images in advance of the telephone conference and does not address the desire to avoid manual interaction with the computer at each site to initiate downloading of the image data. Furthermore, there are some types of presentations for which images cannot be prepared in advance of the presentation and that involve interactive use and display of a software application such as a spreadsheet or drawing program. For example, budget planning and review sessions, design conferences, and distance learning could all benefit from the ability to interact with a software program at one or more of the sites, and have the software program display its output all of the participating sites nearly simultaneously. As with the Dunn et al. method, the system of Watson may undesirably leave residual image data on participant computers. Thus a need exists for a dataconferencing system that allows on-demand distribution of presentation content and control of remote presentation displays on-the-fly, without the use of an expensive centralized data storage server and without user interaction at each remote conference site.

While many conference facilities include a network connection point, such as a wall jack for an Ethernet, most facilities do not keep a computer connected to the network. Consequently, a significant amount of time is required to configure the network connection for the computer that will be used at each of the conference sites. The time and difficulty of connecting to the network may be compounded by the use of laptop or other mobile computers that are configured for use with other networks or at other locations within the same network, and not configured for use at the conference site. None of the systems described above overcome the difficulties associated with configuring a computer for connection to a computer network at each of the conference sites in advance of each dataconference session. A need exists for a simplified method of connecting a computer or other display device to a data network, for use in dataconferencing.

A need also exists for dataconferencing apparatus that includes a projector connection, a computer network connection, a voice network connection, and a dataconferencing control mechanism in a single convenient tabletop unit.

SUMMARY OF THE INVENTION

In accordance with the present invention, each of two or more geographically separate conference sites has a telephone receiver and a dataconferencing appliance coupled to a voice call network, such as a Public Switched Telephone Network ("PSTN") or Private Branch Exchange ("PBX"). Each site also has a display device, such as a computer display screen or an electronic projector, for displaying images comprised of image data produced by an image source. To facilitate sharing of image data between the sites, a network interface at each site couples a dataconference control unit of the dataconferencing appliance to a data network that links the sites independently of the voice call network.

To initiate a dataconference session between the sites, a voice call session is first established between the telephone receivers via the voice call network. An access negotiation procedure implemented in software or hardware on the dataconference control units is then manually initiated at a first one of the sites to identify a network device access code and communicate it to at least a second one of the sites. The network device access code is communicated by generating an audio signal representative of the network device access code and transmitting it within the voice call session. In response to receipt of the audio signal at the second site, the access negotiation procedure of the dataconference control unit at the second site uses its network interface module and the received network device access code to join a data communication session between the sites via the data network, thereby eliminating any need for dataconference participants to identify the network device access code or to personally interact to establish a data communication session. Once the data communication session has been established, images are then conveniently transmitted between the sites via the data network for display on the display devices and the audio portion of the conference call is resumed on the voice call using the telephone receivers at each site.

In a preferred embodiment, the dataconference control unit, telephone receiver, and network interface are integrated in a dataconferencing speakerphone appliance that can be conveniently positioned on a conference table at each of the sites and coupled to the data network, the voice call network, and the display device to facilitate dataconferencing in accordance with the present invention. A manually activatable input key is provided for initiating the access negotiation procedure.

In other embodiments, the dataconferencing appliance is implemented in software operating on a computer workstation that can also serve as the display device, telephone receiver, and/or image source; or in hardware as a simplified dataconferencing appliance that can be used with a separate telephone receiver, display device, and image source. Dataconferencing appliances in accordance with the invention may include network connectors and automatic network configuration routines for simplifying connection of an image source, such as a presenter's laptop computer, to the data network.

Additional aspects and advantages of this invention will be apparent from the following detailed description of preferred embodiments thereof, which proceeds with reference to the accompanying drawings.

DEFINITIONS

Figure 1:
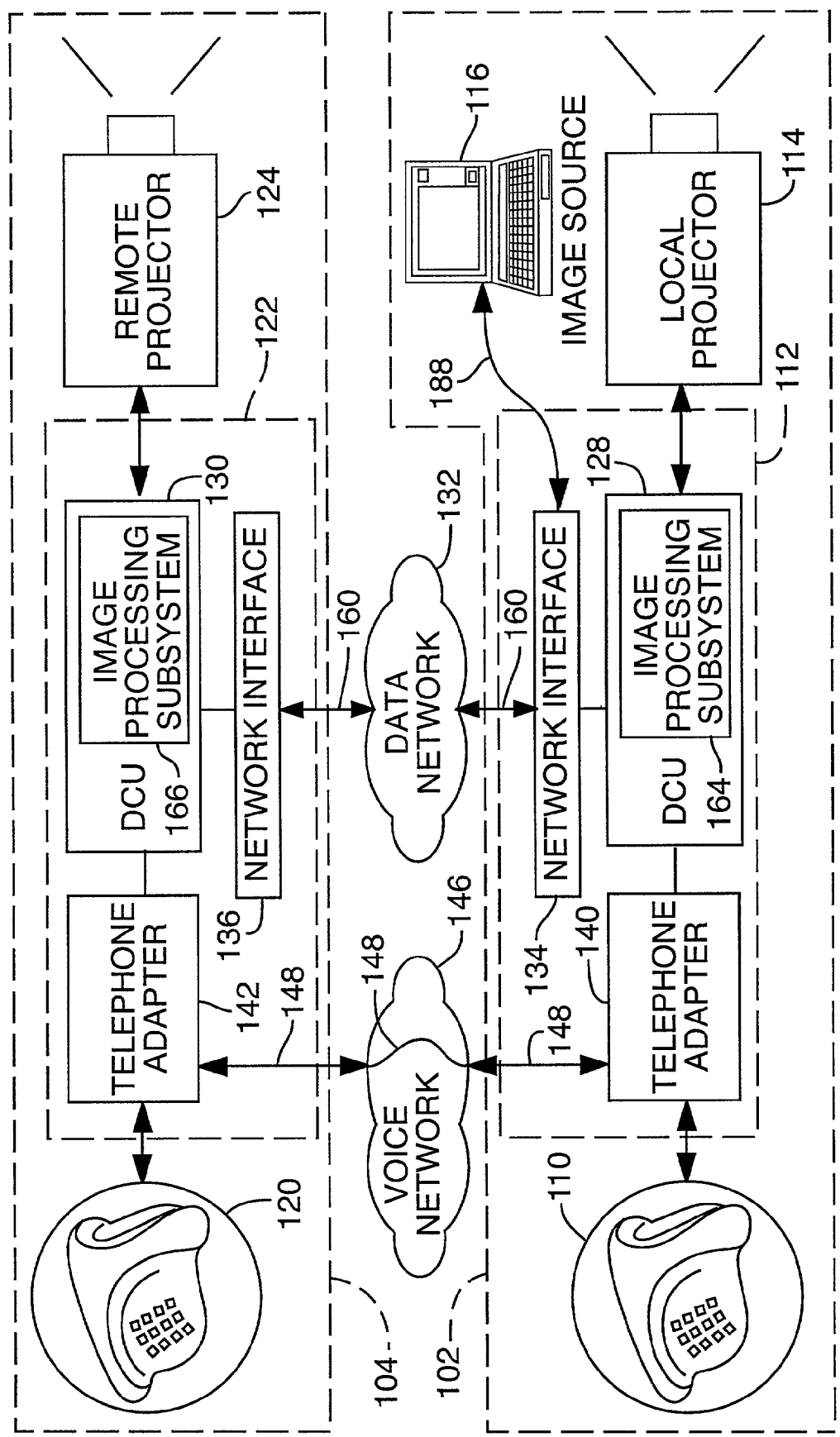
FIG. 1 is a block diagram of a simplified dataconferencing system including local and remote dataconferencing appliances in accordance with a first preferred embodiment of the present invention.

The terminology used in this application, including terms in the Summary of the Invention, Detailed Description of Preferred Embodiments, and claims sections, shall have the following meanings unless otherwise clearly indicated by the context in which used:

"data network"—a network for transmitting data encoded as digital signals, including, e.g., local area networks (LANs), wide area networks (WANs), and the Internet; a data network may include one or more modem transmission path segments that transmit data in analog form over a voice network but that are exclusive of voice communication sessions; data networks are distinguished from voice networks, which are designed to handle voice calls for transmission of analog signals representing audio and not specifically designed to carry digital data.

"DHCP" (dynamic host configuration protocol)—a TCP/IP protocol that automates the assignment and allocation of IP addresses to a host within a domain or corporate network; DHCP servers typically also include a proxy server or network address translation (NAT) server that allows hosts to be addressable within a domain but not from outside of the domain.

"display device"—any device for displaying characters or images including direct-view displays such as computer monitors, raster displays, and the like, as well as indirect displays such as electronic projector devices of the type sold by InFocus Corporation, Wilsonville, Oreg., USA, the assignee of the present application, regardless of where mounted and whether or not capable of direct connection to a data network.

"DTMF" (dual-tone multi-frequency)—tones of the type generated when keys of a telephone's touchpad are depressed, including the 12 distinct tone pair frequency combinations used for what is commonly known as "touchtone" dialing, as well as other tone pair frequency combinations not available on a telephone touchpad.

"electronically generated audio signal"—signals representing tones or sounds in the audible or near-audible range of frequencies, including, e.g., clicks, beeps, DTMF tones, and modem tones, that are generated by electronic circuitry and capable of being transmitted through a voice network without significant attenuation.

"image source"—a device that generates, produces, or reproduces a set or stream of data representing one or more still images or video frames; example image sources include personal computers, laptop computers, video playback devices such as DVD players and VCRs (with either analog or digital video outputs), digital cameras (still or motion-picture, including "webcams"), digitizing scanners, and personal digital assistants (PDAs).

"independent" voice and data networks—voice and data networks as defined herein, through which parallel, exclusive voice call and data network sessions are established; the equipment of a voice network (typically circuit switching) is often physically distinct from equipment of a data network (usually packet switching), but it need not be so; however, a data network session is always logically distinct and separate from a voice call session, even if the data network session includes an analog or DSP modem transmission path segment carried by a POTS network and even if voice calls are carried by data network equipment, e.g., using voice-over-IP technology.

"key" or "input key"—a interface device such as a pushbutton, a switch, or a software button capable of being activated by a mouseclick or other computer input action; or any other input device for receiving one or more bits of data used to initiate negotiation procedures of the invention or to trigger other events within the system of the present invention.

"network device access code" or "network access code"—any type of address or code for accessing a device on a data network; example network access codes may include, without limitation, network addresses such as domain names, uniform resource locators (URLs), IP addresses (including static, dynamic, symbolic, and virtual addresses) compliant with IPv4 or IPv6 (including IPv4 with classless interdomain routing (CIDR)), and physical addresses (e.g., Ethernet addresses); and/or passcodes such as session identification codes, passwords, cookies, encryption codes or keys, and digital signatures.

"POTS"—acronym for "plain old telephone system"; a widely-used suite of telephone interface and protocol standards that provides interoperability between the networks of voice telephone services providers worldwide; POTS networks typically include circuit switched telephone networks and equipment for use therewith, although some packet switched networks may also interface with POTS networks.

"Public Switched Telephone Network" (PSTN)—an aggregate of telephone communication resources available to the public at large, including resources providing local and long-distance land-based, wireless, and cellular telephone services.

"telephone receiver"—all types of devices capable of connection to a voice network for receiving analog or digital signals representative of audio telecommunications, including, without limitation, POTS telephone receiver sets, ISDN telephone receivers, VoIP telephones, speakerphones, headsets, wireless telephone handsets, cellular or PCS telephones, computer workstations with telephone emulation software and any other analog or packet telephone devices.

"voice call" or "voice call session"—any audio communication session in which a caller dials a telephone number assigned to the call recipient's telephone receiver, causing an incoming call indication (usually ringing) at the recipient's telephone receiver; a voice call session begins after the call recipient answers his or her telephone receiver; voice calls are typically carried by a POTS network, but may be carried by any other communication network, provided that the voice call session is logically separate from and not interlinked with any digital data network sessions.

"voice network"—any network configured to handle voice calls; typically a POTS network, but possibly including packet-switched networks and portions of data networks over which a voice-over-IP call is made.

"voice-over-IP" (VoIP)—an audio call in which at least one end-segment of the call path traverses a data network; VoIP involves digitizing the audio signal, transmitting the digitized signal over a packet-switched data network using Internet Protocol (IP), and converting the digitized signal back to analog audio for listening at the receiving end of the audio call.

Terminology used in this application that is not expressly defined above shall be accorded the meaning generally understood by those skilled in the art, given the context in which it is used.

DETAILED DESCRIPTION OF THE PREFERRED EMBODIMENT

FIG. 1 is a block diagram of a simplified dataconferencing system 100 operating at a local site 102 and a remote site 104 in accordance with a first preferred embodiment of the present invention. With reference to FIG. 1, local site 102 includes a local speakerphone 110 including a local dataconferencing appliance 112. A local display device 114, such as a projector, and an image source 116, such as a laptop computer, are also connected to local dataconferencing appliance 112. Remote site 104 includes a remote speakerphone 120 connected to a remote dataconferencing appliance 122, which is in turn connected to a remote display device 124. Local and remote dataconferencing appliances 112 and 122 include respective local and remote dataconference control units 128 and 130, which are coupled to a data network 132 via respective local and remote network interfaces 134 and 136 of dataconferencing appliances 112 and 122. Local and remote network interfaces 134 and 136 are preferably integrated with local and remote dataconference control units 128 and 130, for example in the form of diskless embedded computers loaded with software embodying dataconferencing methods in accordance with the present invention, as described below with reference to FIG. 2. Local and remote dataconferencing appliances 112 and 122 also include respective local and remote telephone adapters 140 and 142 coupled to a voice network 146 via an incoming telephone line (RJ-11 jack), a handset line of a telephone receiver (RJ-22 jack), or any other means for communicating audio signals of a voice call. Local and remote telephone adapters 140 and 142 are connected to the respective local and remote dataconference control units 128 and 130, e.g., via a PCI bus or parallel port (not shown), and to speakerphones 110 and 120, respectively, e.g., via RJ-11 jacks, RJ-22 jacks, or other telephone audio lines (not shown).

The components and arrangement of local speakerphone appliance 110, local dataconferencing appliance 112, and local display device 114 may be identical to the corresponding remote speakerphone 120, remote dataconferencing appliance 122, and remote display device 124, both in design and arrangement, i.e., system 100 may be symmetric across local and remote sites 102 and 104. However, the components of system 100 need not be symmetric or, for that matter, identical. For example, different schemes of partitioning or integrating some or all of the components of dataconferencing system 100 are within the scope of the present invention, as further described below with reference to FIGS. 3–12. Furthermore, dataconferencing systems in accordance with the present invention need not be limited to two sites and can be used to establish dataconferencing sessions with more than two sites, as described below with reference to FIG. 12.

Figure 2:
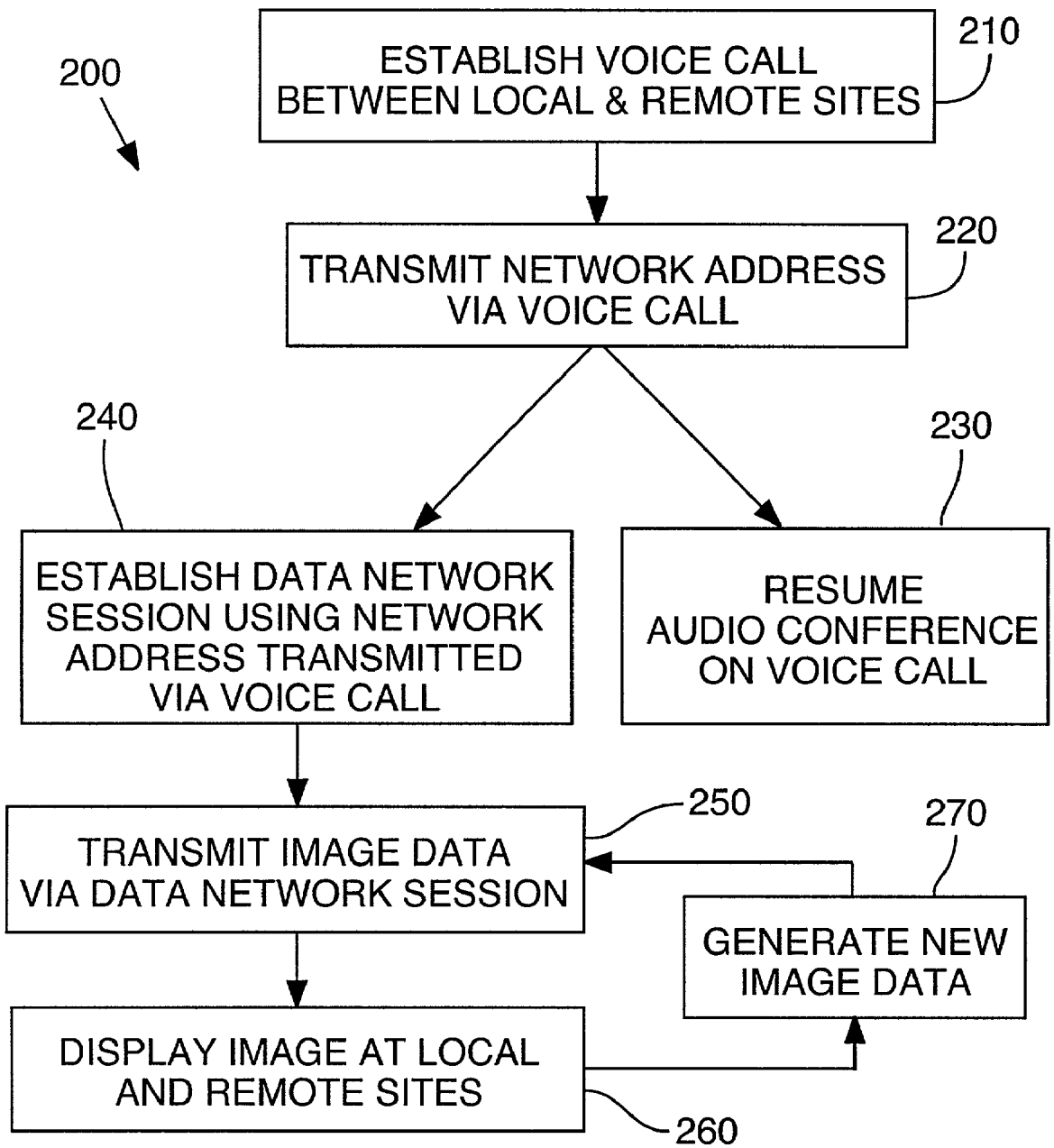
FIG. 2 is a flow chart depicting a dataconferencing method performed by the system of FIG. 1.

FIG. 2 is a flow chart depicting a dataconferencing method 200 performed by dataconferencing system 100 of FIG. 1. With reference to FIGS. 1 and 2, a voice call 148 (represented by a call path through voice network 146 in FIG. 1) is established between local and remote speakerphones 110 and 120 (step 210). Voice call 148 may be established using conventional telephone dialing (e.g., 7-digit, 10-digit, or 11-digit dialing within North America; international dialing; and 3-digit, 4-digit, or 5-digit dialing within a PBX network), or by other methods, e.g., using VoIP calling methods. Each of the telephone adapters 140 and 142 may include an audio bridge (not shown) that couples respective speakerphones 110 and 120 to voice network 146 and which allows telephone adapters 140 and 142 to passively monitor the telephone line to determine its status, for example, whether the speakerphones 110 and 120 are off-hook and whether voice call 148 has been established.

To establish a data communication session between local and remote sites 102 and 104 via data network 132, a user at one or both of the sites 102 and 104 manually activates system 100 at any time during the voice call session using an input key (not shown) located on an initiating one of the dataconferencing appliances 112 and 122. Preferably the input key is a pushbutton that can be manually actuated by a user. Manually activating the input key throws a switch within the initiating dataconferencing appliance that causes it to begin an access negotiation procedure (hereinafter "negotiation procedure"). The input key may be manually activated a second time to terminate the datacommunication session. The following example of the negotiation procedure involves initiation of the negotiation procedure at local site 102; it being understood that the negotiation procedure could, alternatively, be initiated from remote site 104. To enable the negotiation procedure via voice network 146, local and remote telephone adapters 140 and 142 include circuitry that generates audio signals (not shown) and transmits them within the voice call 148 in response to commands, which are issued by the negotiation procedure (step 220). The telephone adapters 140 and 142 also include circuitry for recognizing such audio signals when received via voice call 148. At least some of the audio signals transmitted in accordance with the negotiation procedure encode a network device access code.

The network device access code (hereinafter "network access code" or "access code") may be any type of computer network address, data network address, or code associated with local dataconferencing appliance 112 or with the dataconferencing session itself, such as, for example, a domain name, a URL, an IP address compliant with IPv4 or IPv6 (including IPv4 with CIDR), a virtual address (such as a multicast group address), a physical address (e.g., an Ethernet address or other MAC address), a session ID, or a passcode. The format for the address is predefined and commonly available to the negotiation procedures of the dataconference control units 128 and 130, and may include a 32-bit IPv4 address expressed as a series of 12 decimal digits, for example. Audio signals used for transmitting the network access code (and any other data transmitted during access negotiation) may include blank-and-burst techniques, DTMF tones, notch modem signals, and other types of electronically generated audio signals capable of transmitting data within an active voice call session with little or no interruption of the voice call and without terminating the voice call session.

After receipt of the audio signals at remote dataconferencing appliance 122 and subsequent recognition of the network access code, dataconferencing system 100 resumes the audio conference portion of the dataconference via voice call 148 (step 230). Concurrently with resumption of the audio conference, local and remote dataconferencing appliances 112 and 122 establish a data network session 160 over data network 132 via their respective network interface modules 134 and 136 (step 240), preferably using known Internet protocols. Once the data network session 160 has been established, dataconferencing system 100 can transmit image data between local and remote sites 102 and 104 via data network session 160 (step 250) while the audio component of the dataconference is carried by voice call 148 (step 230).

One preferred protocol for establishing data network session 160 involves the use of multicast group addressing ("multicasting"). In multicasting, the network access code includes a single multicast group address that is selected from a range of available multicast group addresses reserved in accordance with IPv4 or IPv6 standards. Any device on the data network can join a multicast group and receive transmissions sent to the selected multicast group address. Multicasting is a group transmission model that restricts data transmission to only those parts of the data network where group members are located. It is useful for communication between two or more sites and has a benefit of avoiding problems associated with addressing of dataconferencing appliances that are hidden behind domain proxies or within corporate networks using DHCP. Multicasting reduces network traffic when sending data to multiple dataconference participants and facilitates transmission of images from any of the dataconference sites to all other participating sites.

Multicast group address selection may involve the use of a multicast address dynamic client allocation protocol service ("MADCAP") accessible via the data network. Alternatively, a multicast group address may be selected at random by the initiating dataconferencing appliance, for example, by identifying an idle multicast group address using trial and error techniques. Other procedures may be possible for multicast group address selection. Because all dataconferencing appliances that join the multicast group are addressable at the same network address (i.e., the multicast group address), the address negotiation procedure need involve only a single transmission of the commonly used multicast group address from the initiating dataconferencing appliance, via voice call 148, to distribute the network address to participating sites. Upon receipt of the multicast group address, all participating sites join the multicast group to establish a data connection therebetween via the data network.

The access negotiation procedures of local and remote dataconferencing appliances 112 and 122 may also include security protocols that involve the exchange of encryption codes, either over data network 132 or voice network 146, or both, for enabling encrypted data communications between local and remote dataconferencing appliances 112 and 122.

To improve the responsiveness and efficiency of system 100, local and remote network interfaces 112 and 122 preferably include respective local and remote image processing subsystems 164 and 166 for compressing image data prior to transmission via data network session 160 and for decompressing image data upon receipt. In the alternative, compression of images may be performed in software or hardware at image source 116, with decompression being performed only at local and remote image processing subsystems 164 and 166 prior to delivery of substantially identical uncompressed images to the respective local and remote display devices 114 and 124 connected thereto. Image processing subsystems 164 and 166 may also perform image scaling for resizing images to fit the pixel resolution of the respective local and remote display devices 114 and 124 prior to delivery of the images.

Local image processing subsystem 164 may include a frame buffer (not shown) for receiving frames of image data 188 from image source device 116 and for sensing changes in the image represented by image data 188. When a change is sensed by local image processing subsystem 164, the current frame of image data 188 is processed for display on local display device 114 (step 270) and, separately, compressed for transmission within data network session 160. Preferably, however, frame buffering and change detection is performed in software on image source device 116 to reduce the amount of data 188 transmitted between image source 116 and local dataconferencing appliance 112.

In addition to handling the transmission of image data within data network session 160, local and remote dataconferencing appliances 112 and 122 are coupled to respective local and remote display devices 114 and 124 for exchanging control data (not shown) for controlling the images displayed, for reporting error conditions, and for communicating any other information useful for facilitating the dataconference.

By eliminating the need for image data to be distributed in advance of a dataconferencing session to all of the participating dataconferencing sites or to a centralized server, the present invention allows images to be distributed and displayed "on-the-fly" nearly concurrently with their generation or playback at the image source. Distribution and display of images on-the-fly also reduces image data storage required at each participating dataconferencing site. Dataconferencing systems in accordance with the present invention can also be configured so that no residual image data is left at participating sites after termination of the dataconferencing session.

As will be readily understood by those skilled in the art, the functions of the speakerphone, the dataconference control unit, the telephone adapter, the network interface, the image processing subsystem, and the display device can be partitioned and configured at each presentation site in any of various ways. Furthermore, the configuration and partitioning of the dataconferencing components can result in different connection layouts within each dataconference site and to the voice and data networks accessible at the sites. FIGS. 3–12 are network diagrams showing several preferred and alternative dataconferencing system configurations, it being emphasized that the configurations shown in FIGS. 3–12 are exemplary only and not exhaustive of possible system and network configurations within the scope of the present invention.

Figure 3:
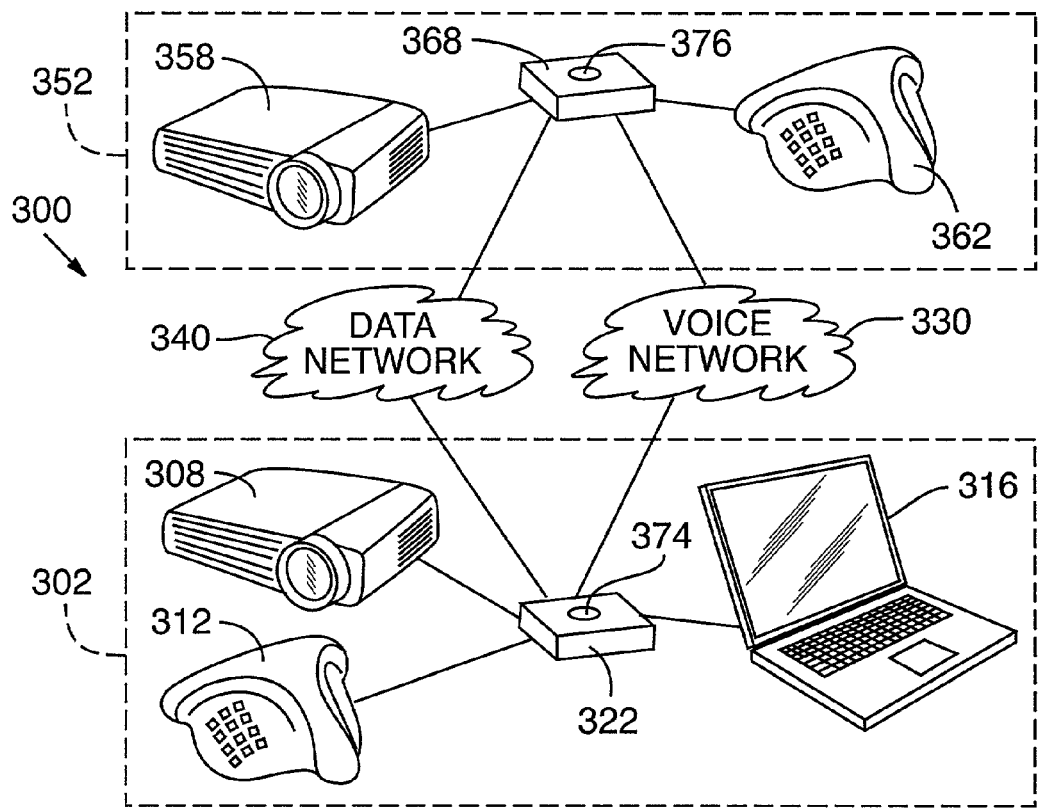
FIG. 3 is a network diagram showing the dataconferencing system of FIG. 1 operating between a local dataconferencing site and a remote dataconferencing site.

With reference to FIG. 3, a dataconferencing system 300 in accordance with the first preferred embodiment 100 described above with reference to FIG. 1, includes at a local site 302 a local projector 308 (or other display device), a local speakerphone 312, and an image source 316, all connected to a simplified local dataconferencing appliance 322. Local dataconferencing appliance 322 includes a telephone adapter (not shown) for connecting to a voice network 330 and a network interface (not shown) for connecting to a data network 340, which is independent of voice network 330.

At a remote site 352, a remote projector 358 (or other display device) and a remote speakerphone 362 are connected to a remote dataconferencing appliance 368. Remote dataconferencing appliance 368 includes a telephone adapter and a network interface (not shown) for connecting remote dataconferencing appliance 368 to respective voice and data networks 330 and 340.

Local and remote dataconferencing appliances 322 and 368 include respective pushbuttons 374 and 376 or other input key means for initiating a negotiation procedure implemented in software and/or hardware of appliances 322 and 368. Local and remote dataconferencing appliances 322 and 368 may be identical in all respects; however, in the embodiment 300 shown, remote dataconferencing appliance 368 need not include an interface for connecting an image source at remote site 352. In operation, a dataconferencing session is established using dataconferencing system 300 in accordance with the method described above with reference to FIG. 2. In particular, a voice call is first established between local and remote speakerphones 312 and 362. One of the local and remote dataconferencing appliances 322 and 368 is then activated by depressing one of the pushbuttons 374 and 376, which initiates negotiation procedures of the respective local and remote dataconferencing appliances 322 and 368. The negotiation procedures cause a network address to be encoded as electronically generated audio signals, which are transmitted between the respective local and remote dataconferencing appliances 322, 368 exclusively over voice network 330. Following completion of address transmission, local and remote dataconferencing appliances 322 and 368 use the network address establish a data network session therebetween via data network 340.

Figure 4:
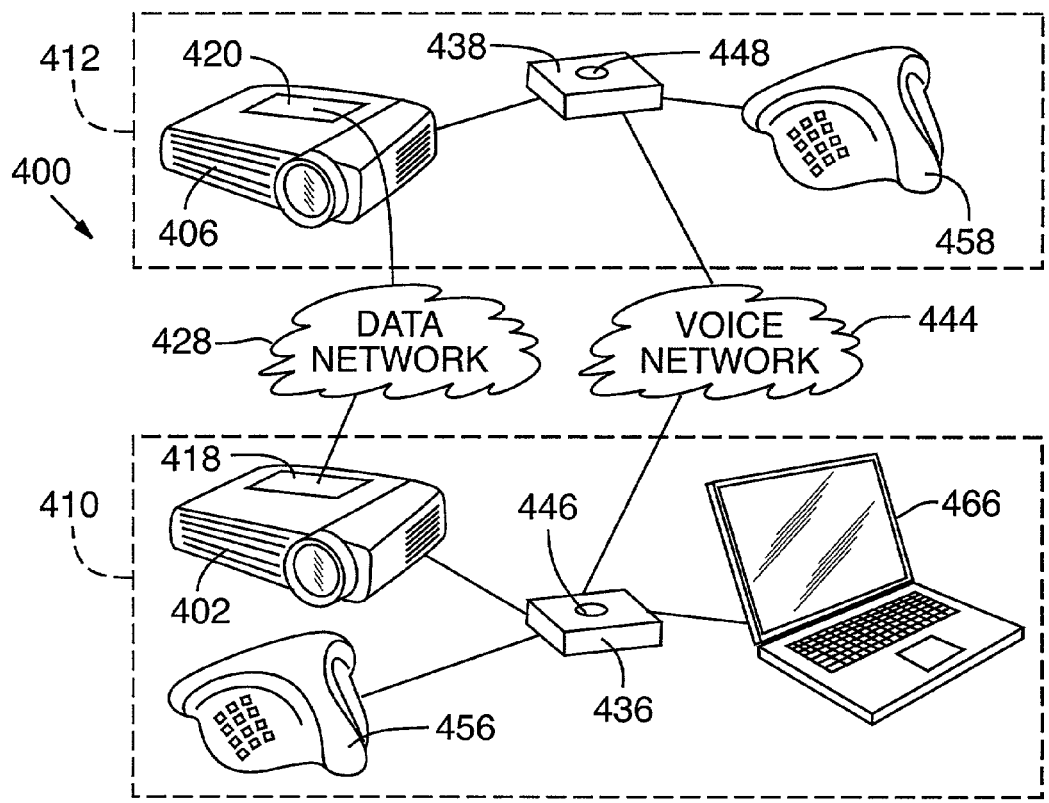
FIG. 4 is a network diagram showing a second preferred embodiment dataconferencing system, including network-enabled projectors having integrated network interfaces for communication therebetween over a data network.

FIG. 4 is a network diagram showing a second preferred embodiment dataconferencing system 400. With reference to FIG. 4, local and remote projectors 402 and 406 at respective local and remote sites 410 and 412 include respective local and remote network interface modules 418 and 420 for connecting projectors 402 and 406 directly to data network 428. Local and remote dataconferencing appliances 436 and 438 each include a dataconference control unit and a telephone adapter (not shown) coupled to a voice network 444. Local and remote dataconferencing appliances 436 and 438 include pushbuttons 446 and 448, respectively, either one of which can be manually depressed to initiate negotiation procedures via voice network 444 for establishing a data networking session in accordance with the present invention.

Local and remote speakerphones 456 and 458 are connected to respective local and remote dataconferencing appliances 436 and 438 in the same manner as first embodiment dataconferencing system 300 (FIG. 3). Similarly, an image source 466 is connected to local dataconferencing appliance 436. However, contrary to the configuration shown in FIG. 3, the local and remote network interfaces 418 and 420 are integrated with or installed in respective local and remote projectors 402 and 406 for direct connection of the projectors 402 and 406 to data network 428. In furtherance of their direct network connection, projectors 402 and 406 desirably have integrated image processing subsystems. Thus all image transfer and display functions are handled by the projectors 402, 406 so that local and remote dataconferencing appliances 436 and 438 need only provide control unit functions, including initial dataconference negotiation procedures and any other interaction with voice network 444.

Figure 5:
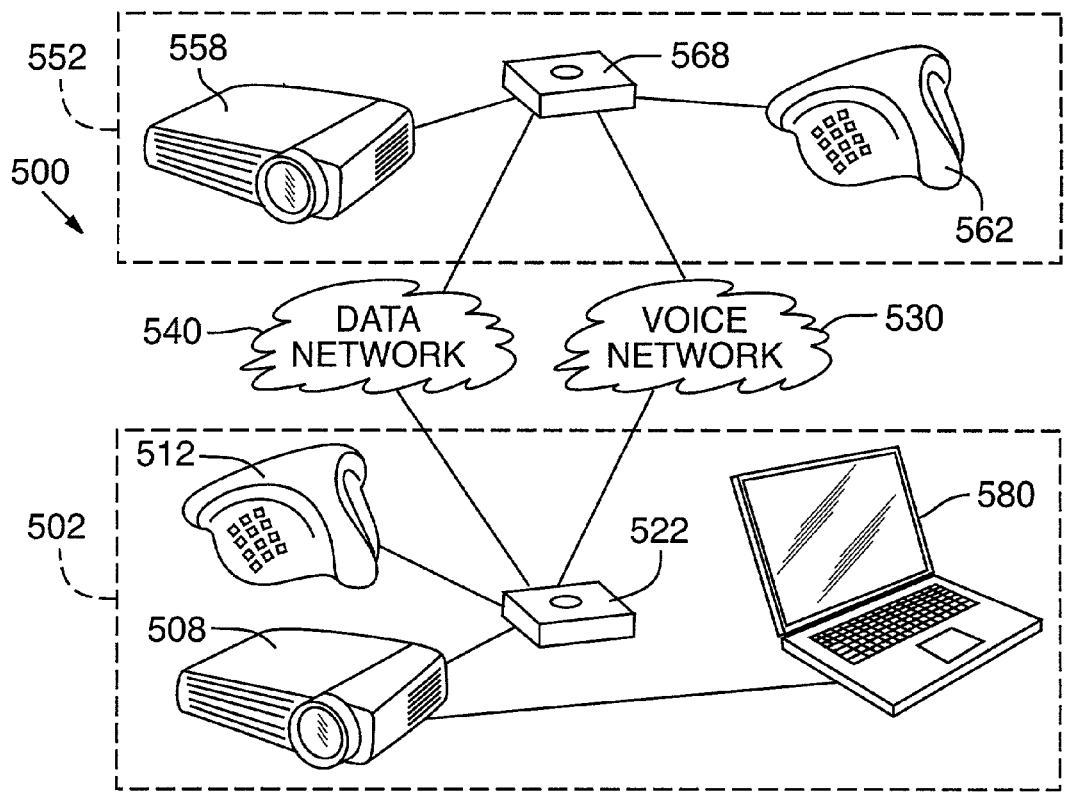
FIG. 5 is a network diagram showing a third preferred embodiment dataconferencing system, including a laptop computer serving as an image source that is directly connected to one of the display devices.

FIG. 5 is a network diagram showing a third preferred embodiment dataconferencing system 500. With reference to FIG. 5, dataconferencing system 500 includes, at respective local and remote sites 502 and 552, local and remote projectors 508 and 558, local and remote speakerphones 512 and 562, and local and remote dataconferencing appliances 522 and 568, all organized and connected to voice and data networks 530 and 540 in substantially the same configuration as first preferred embodiment dataconferencing system 300 (FIG. 3), except that an image source 580 is connected directly to local display device 508, rather than to the local dataconferencing appliance as in the system 300 of FIG. 3. The configuration of this third preferred embodiment system 500 differs from that of the first preferred embodiment system 300 in that images generated by image source 580 are displayed by local display device 508 without prior image processing by an image processing subsystem of local dataconferencing appliance 522. In other words, the raw image data from image source 580 is used by local display device 508, which may have its own integrated image processing subsystem. Local dataconferencing appliance 522 receives image data from local display device 508 and compresses the image data before transmission via data network 540 for receipt by remote dataconferencing appliance 568. Remote dataconferencing appliance 568 includes an image processing subsystem for decompressing the received image before delivery of the image data to remote display device 558 for display, similar to the decompression step described above with respect to the first preferred embodiment dataconferencing system 300.

Figure 6:
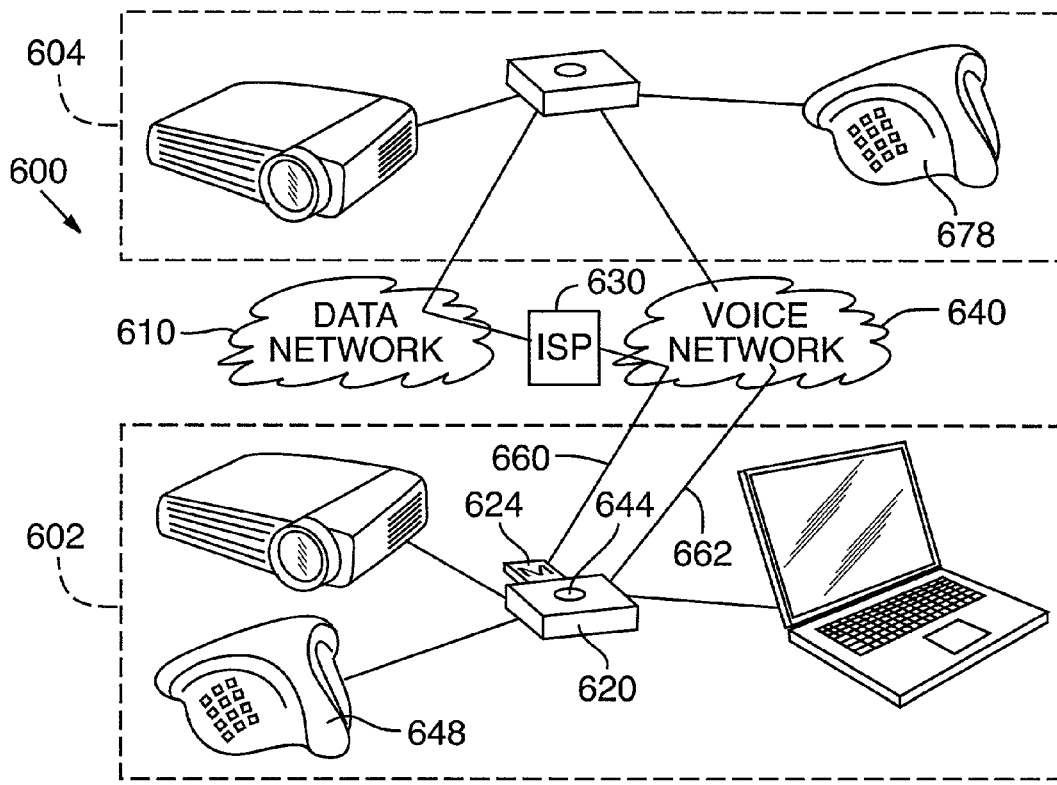
FIG. 6 is a network diagram showing a fourth preferred embodiment dataconferencing system, in which the network interface of one of the dataconferencing appliances includes a modem for accessing the data network via a dial-up connection to an Internet service provider ("ISP")

FIG. 6 is a network diagram showing a fourth preferred embodiment dataconferencing system 600 for use at a local site 602 that does not have direct access to a data network, e.g., via an Ethernet junction or other digital data network access point. With reference to FIG. 6, the network interface of a local dataconferencing appliance 620 includes a telephone modem 624. Modem 624 is configured to indirectly access data network via an Internet service provider ("ISP") 630, with which modem 624 establishes a modem communication session via a voice network 640. For convenience, modem 624 may be configured to automatically dial and log on with ISP 630 for accessing a data network 610 when a pushbutton 644 of local dataconferencing appliance 620 is depressed. Modem 624 may be a conventional voice call modem utilizing, for example, V.90 protocol, in which case two telephone lines would be required, a first line 660 for modem 624 and a second line 662 for the voice call session between a local speakerphone 648 and a remote speakerphone 678.

Alternatively, modem 624 may be a DSP modem (not shown), in which case it could use the same telephone line at local site 602 as that used by local speakerphone 648. In the DSP alternative, the voice call session and the data network session are able to share a single copper telephone line at local site 602 because DSP modems transmit data in a different frequency band from that used by a telephone. At a telephone carrier's central office (not shown) within voice network 640, the voice call and the DSP data session are separated and retransmitted, typically over different physical media, so that the voice call session is routed to remote speakerphone 678 via a voice path and the DSP data session is routed through ISP 630 to remote dataconferencing appliance 568 via a data path (not shown). Consequently, even though the voice call and the data network session share the same physical carrier medium for part of their routes between local and remote sites 602, 604, the voice and data networks 640, 610 remain independent.

Fourth preferred embodiment dataconferencing system 600 illustrates a distinction between voice and data networks of the type used in the present invention. The networks can share physical equipment, but a voice call and a data network session are separate and not interlinked. Consequently, signals of the voice call do not affect the data network session or any associated data network services and, conversely, the signals transmitted in the data network session do not affect the voice call or any associated voice network services. As will be readily understood by those of skill in the art, convergence occurring in modern data networking and voice telecommunications technology is blurring the historically distinguishable features, protocols, and equipment used with voice and data networks. Nevertheless, those skilled in the art will also appreciate that methods of establishing a voice call are different from those used to establish a data networking session, regardless of the physical network equipment and communications media employed for such purposes. It is important to note that a telephone receiver, such as a conference room speakerphone, is typically assigned a telephone number that is indexed in telephone directories or made accessible via a telephone operator. Conversely, data network addresses (e.g., IP addresses) may be dynamically assigned and are not generally indexed in a manner meaningful to the typical dataconference participant.

By eliminating the need for participants to know the network access codes for equipment located at either of the local or remote sites, the present invention greatly simplifies the steps performed by dataconference participants. Dataconference control units in accordance with the present invention are configured to automatically obtain a network access code and to automatically transmit signals in the voice call using an access negotiation procedure to send appropriate access codes to one or more dataconference control units at geographically remote sites.

Some embodiments of the negotiation procedure of the present invention involve exchanging the network addresses of the respective network interface modules. However, other embodiments involve transmission of a multicast group address or a network address or passcode of a centralized conference service that is located, for example, on the World Wide Web. Regardless of the kind of network access code exchanged, the invention eliminates the need for conference participants to input access code information into the dataconferencing system when establishing a dataconferencing session. Furthermore, in some embodiments only one participant need take any action to activate the system, viz, by depressing a key on the participant's dataconferencing appliance or on any other component of the system. Alternatively, other embodiments would require all users to depress or otherwise activate the key before joining the data portion of the dataconference, which could provide enhanced system security.

Figure 7:
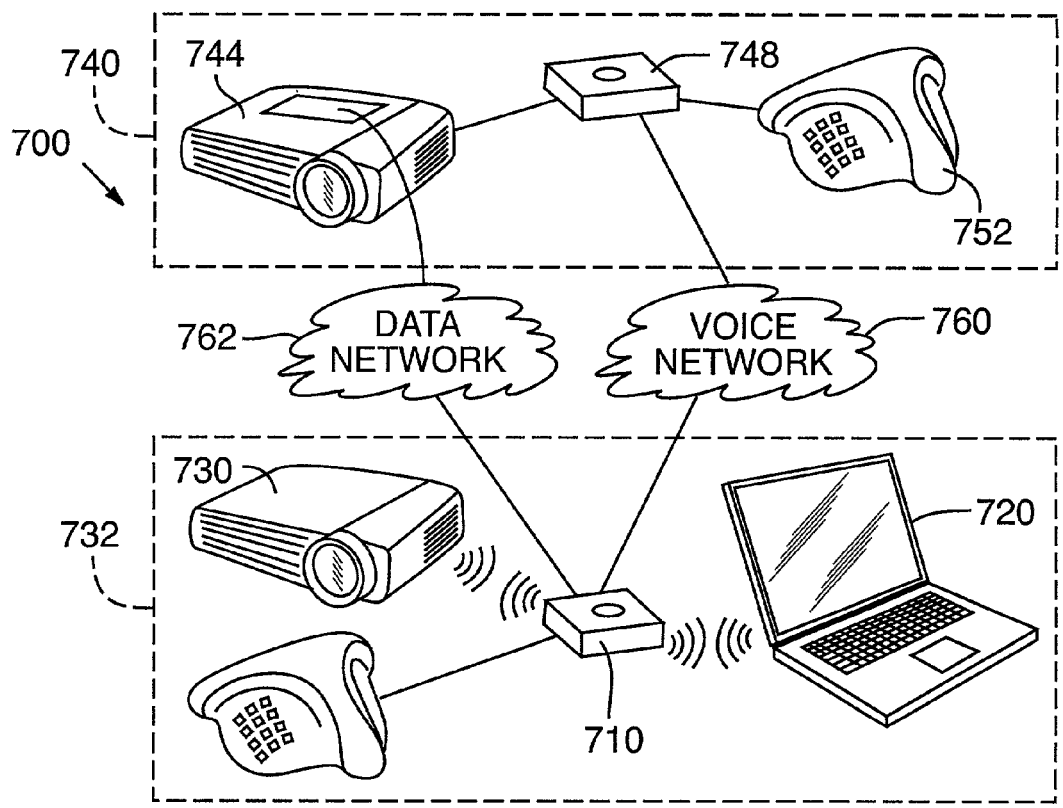
FIG. 7 is a network diagram showing a fifth preferred embodiment dataconferencing system, in which the local dataconferencing appliance includes wireless networking equipment for communication with a local wireless-enabled projector and a local wireless-enabled image source device.

FIG. 7 is a network diagram showing a fifth preferred embodiment dataconferencing system 700 in which a local dataconferencing appliance 710 includes wireless networking equipment (not shown) for communicating with a similarly equipped image source 720 and a similarly equipped display device 730 at a local site 732. At a remote site 740, a remote display device 744, a remote dataconferencing appliance 748, and a remote speakerphone 752 are connected to respective voice and data networks 760 and 762 in the same manner as the corresponding system components of second preferred embodiment system 400 (FIG. 4). Any of various wireless networking technologies can be employed for the wireless networking equipment of local dataconferencing appliance 710, image source 720, and local display device 730. For example, equipment operating in accordance with the IEEE 802.11 standards may be used. Alternative wireless network technologies useful with the present invention include Home RF, infrared networking, and any other short- and long-range wireless networking systems and devices, including short-range peer-to-peer wireless networking such as BLUETOOTH. Skilled persons will appreciate, however, that the data transfer rates supported by the different wireless networking technologies will affect the performance of the system and may necessitate additional steps of image data compression and decompression for efficient wireless transmission between the components of system 700.

Figure 8:
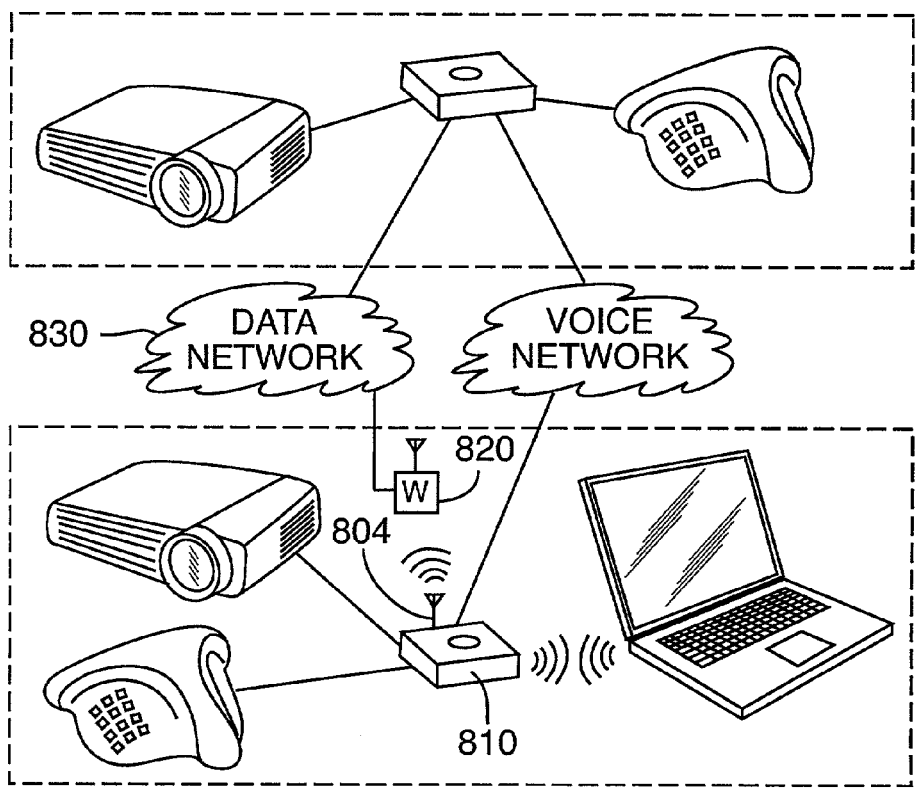
FIG. 8 is a network diagram of the dataconferencing system of FIG. 7 in which the local dataconferencing appliance further includes wireless networking hardware for communication with an infrastructure wireless networking access point.

FIG. 8 is a network diagram of the dataconferencing system of FIG. 7 in which local dataconferencing appliance 810 further includes wireless LAN hardware 804 for communication with an infrastructure wireless networking access point 820 coupled to a data network 830. Skilled persons will understand that numerous other variations on wireline and wireless networking connections can be employed in accordance with the present invention. The specific combinations of wired and wireless networking shown in FIGS. 7 and 8 are exemplary only and should not be construed as limiting the extent to which wired or wireless networking may be used with dataconferencing appliances and dataconferencing system components embodying the present invention. In general, any of the network connections shown by solid lines connecting components of the dataconferencing system of FIGS. 3–12 can be replaced with wireless links for transmitting data or audio-bearing signals.

Figure 9:
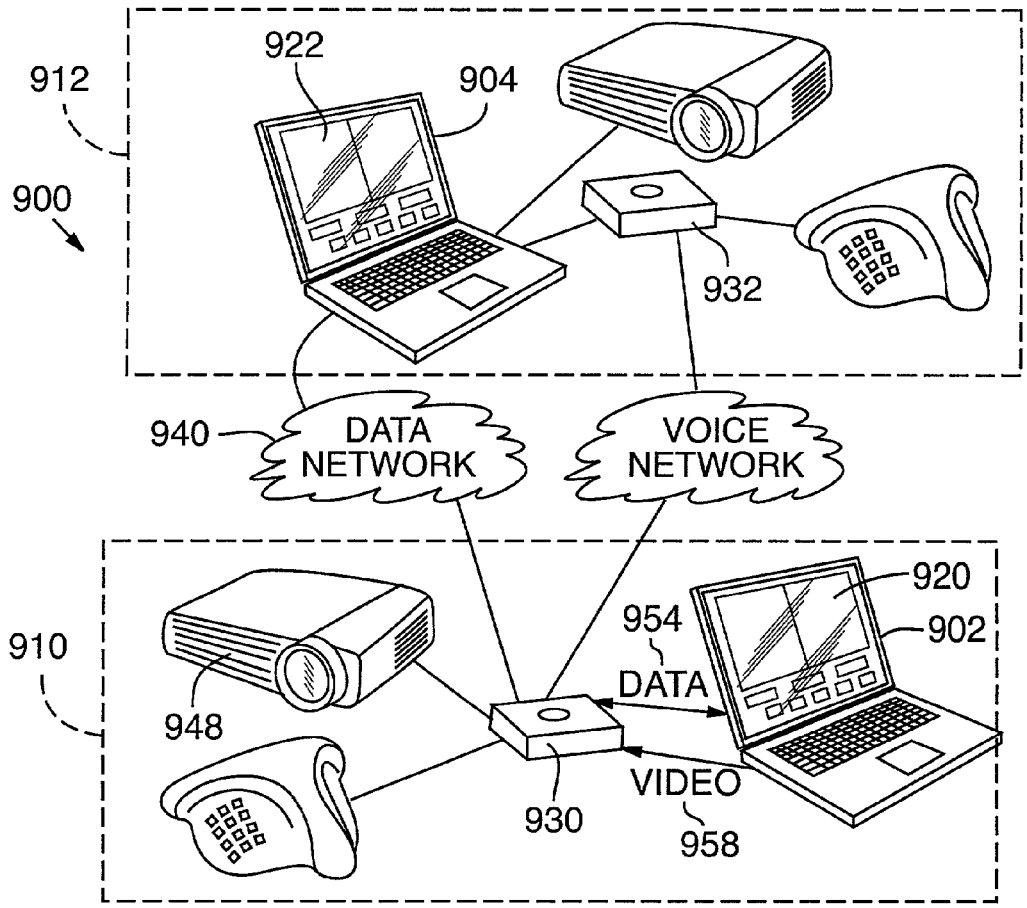
FIG. 9 is a network diagram showing a sixth preferred embodiment dataconferencing system in which two image source devices are used to generate image content concurrently and share the image content between the sites for display on the display devices in split-screen format.

The present invention also facilitates the use of more than one image source for generating a collaborative visual presentation component of a dataconference. FIG. 9 depicts a network diagram of a dataconferencing system arrangement 900 employing local and remote computer workstations 902 and 904 as image sources located at respective local and remote sites 910 and 912. Local and remote computer workstations 902 and 904 execute multi-source presentation management software for facilitating presentation of visual images. For example, local and remotely sourced image content may be presented in a side-by-side manner in split-screen displays 920 and 922. Alternatively, images can be shown as picture-in-picture, alternated, rotated, or tiled at the user's direction or by other criteria. Local and remote dataconferencing appliances 930 and 932 are configured to sense when more than one source of image data is connected thereto (including indirect connections via data network 940) and to accommodate the display of multiple images.

Alternative embodiments of the invention (not shown) accommodate the display of more than one image source across the data network, display of images from multiple image sources directly connected to a single dataconferencing appliance, and the use of multiple dataconferencing appliances at a site.

Figure 10:
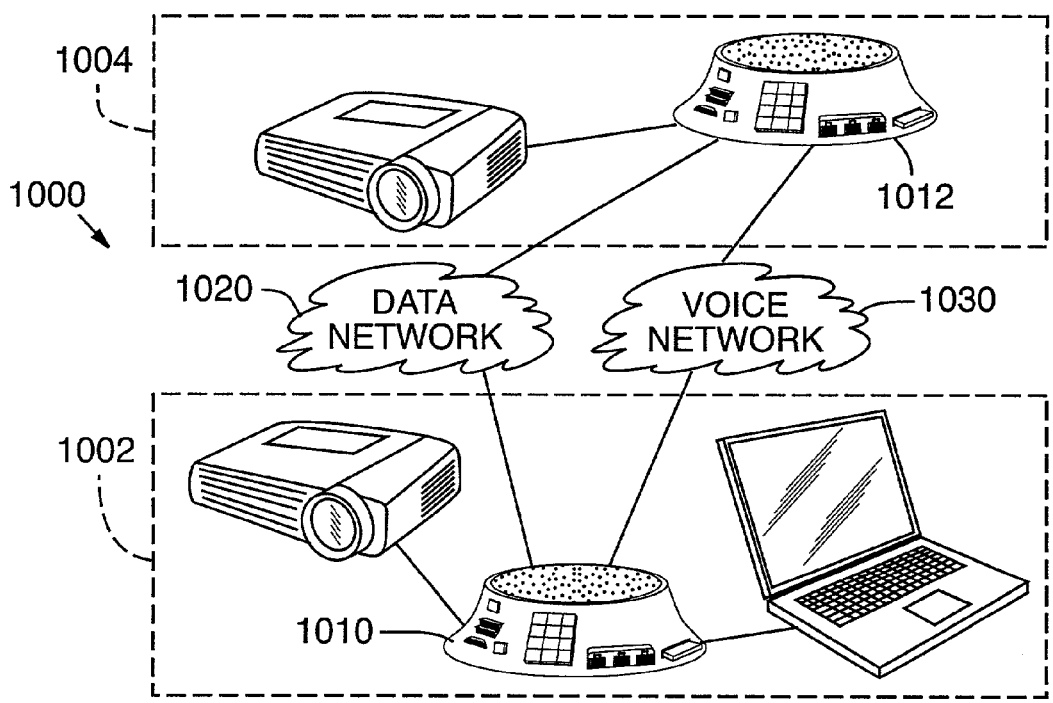
FIG. 10 is a network diagram showing a seventh preferred embodiment dataconferencing system including an integrated dataconferencing speakerphone appliance.

FIG. 10 is a network diagram showing yet another embodiment of a dataconferencing system 1000 in accordance with the present invention. With reference to FIG. 10, dataconferencing system 1000 includes, at each of a local and remote site 1002 and 1004, local and remote integrated dataconferencing speakerphone appliances 1010 and 1012, respectively, which are described in more detail below with reference to FIGS. 13 and 14. Integrated dataconferencing speakerphone appliances 1010 and 1012 perform the functions of both the simplified dataconferencing appliance and the speakerphone of the previously described embodiments of FIGS. 3–9. In addition, integrated dataconferencing speakerphone appliances 1010 and 1012 are intended to be placed on a work surface such as a conference table to provide convenient tabletop access to data and voice networks 1020 and 1030. Optionally, local and remote integrated dataconferencing speakerphone appliances 1010 and 1012 may also serve as wireless networking access points or hubs when equipped with wireless networking hardware.

Figure 11:
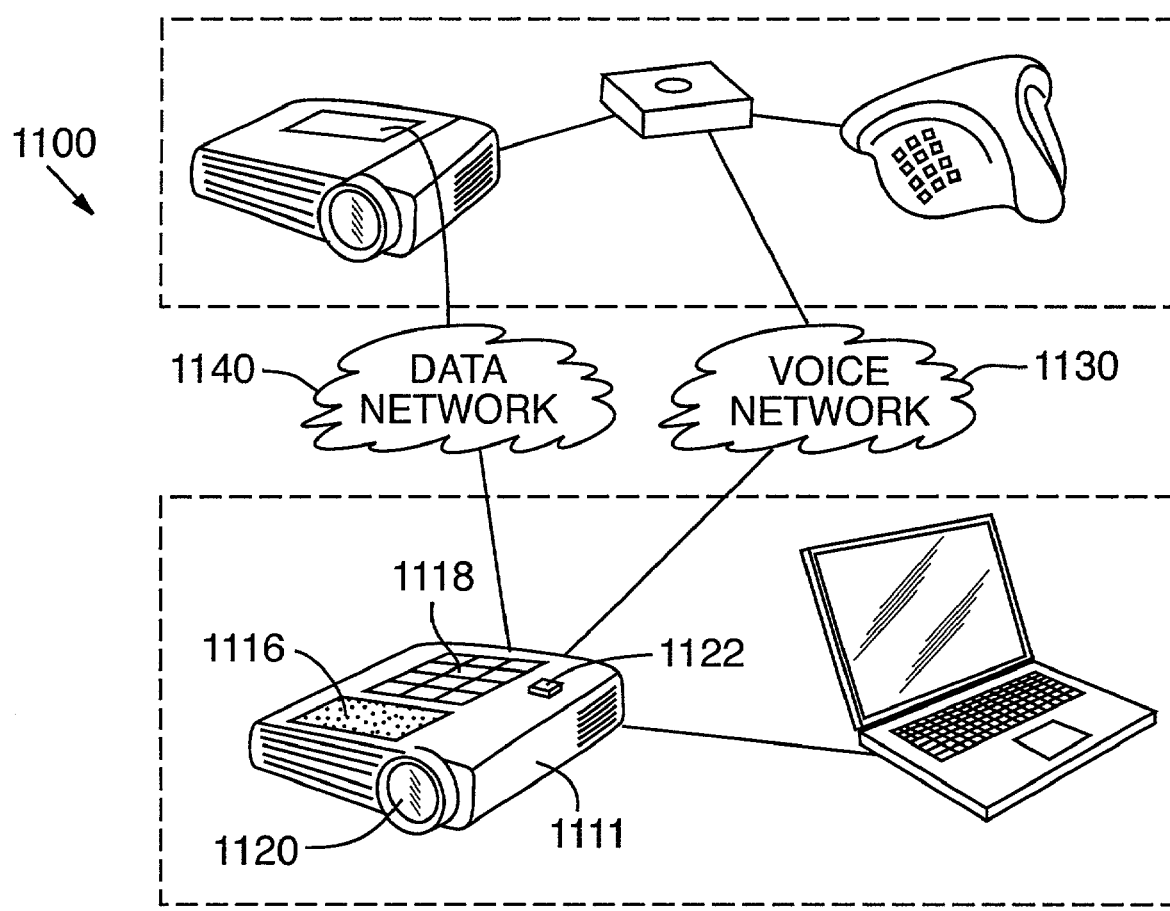
FIG. 11 is a network diagram showing a eighth preferred embodiment dataconferencing system including an combined dataconferencing speakerphone appliance and projector.

FIG. 11 is a network diagram showing still another preferred embodiment of a dataconferencing system 1100 including an integrated dataconferencing projector appliance 1111 having an integrated speakerphone 1116, a telephone keypad 1118, and a projection display device 1120. Integrated dataconferencing projector appliance 1111 also includes an integrated network interface module (not shown), a pushbutton 1122 for activating an integrated dataconference control unit (not shown), and connectors (not shown) for connecting to voice and data networks 1130 and 1140. Advantageously, integration of projection display device 1120 in dataconferencing projector appliance 1111 improves portability of the dataconferencing system and simplifies setup at conference sites. However, many users may prefer to keep a projection-type display device separate from the other system components (as in the dataconferencing systems of FIGS. 3–10) so that the projection display device can be positioned to enhance the quality of the image displayed, e.g., by locating the display device on the ceiling of the conference room while allowing the speakerphone and dataconference control unit to be placed at a conference table for easy access by participants.

Figure 12:
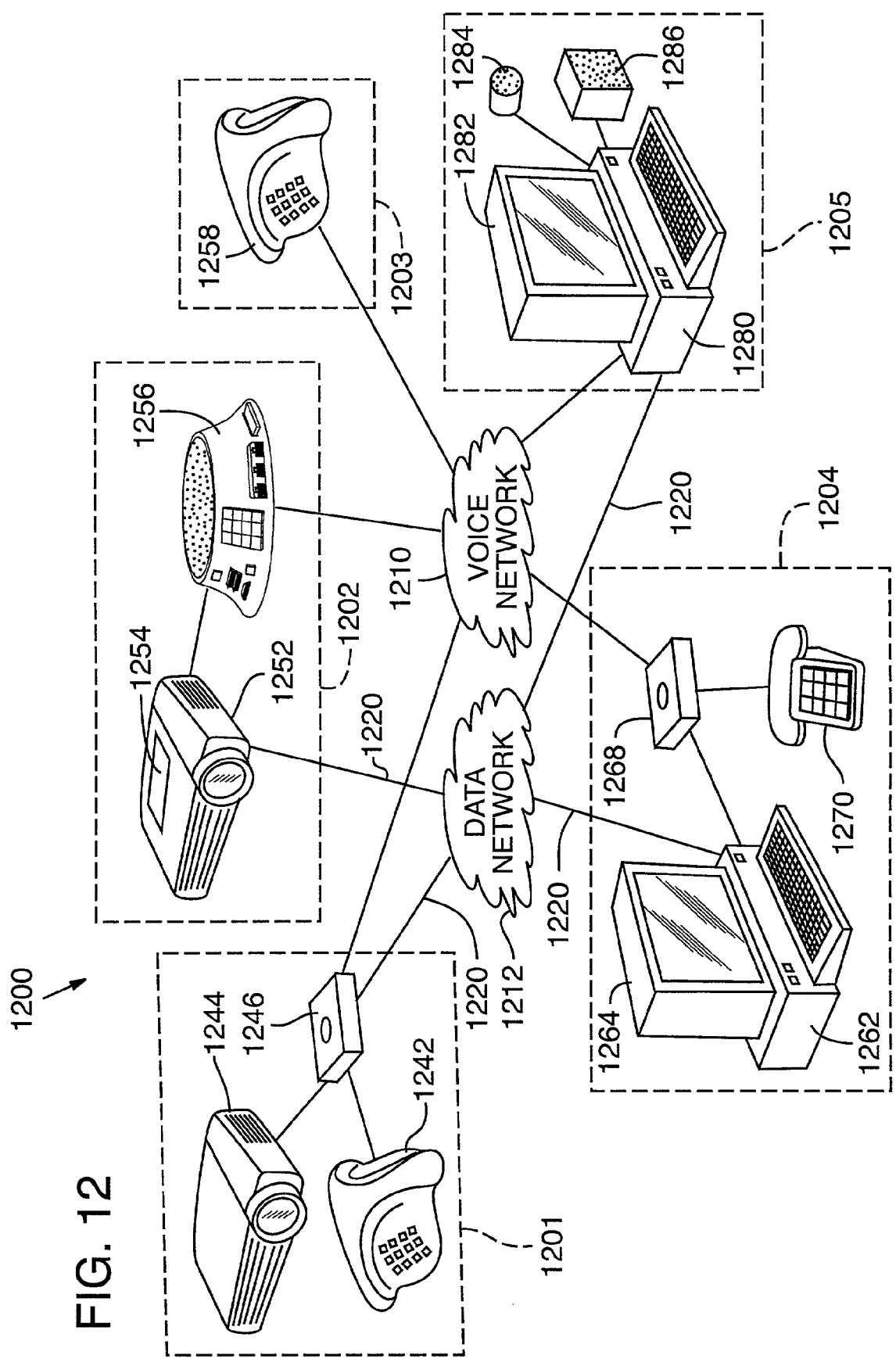
FIG. 12 is a network diagram showing five conference sites participating in a dataconference in accordance with the present invention, including one site without a display device and another site having a dataconference control unit embodied in software on a computer workstation.

The dataconferencing system embodiments described above with respect to FIGS. 3–11 all refer to the use of the system at only two conference sites. In accordance with the present invention, dataconferencing systems, devices, and methods are preferably implemented in a symmetric or "peer-to-peer" manner, which can be employed to link more than two remotely located dataconferencing sites. FIG. 12 is a network diagram showing a dataconference system 1200 linking five conference sites in a five-way dataconference in accordance with the present invention. Notably, the number of dataconferencing sites that can be accommodated by a system in accordance with the present invention is limited only by the speed and capacity of the system and network components. In theory, the present invention is capable of establishing a dataconferencing session between a very large number of participating dataconference sites—possibly hundreds or even thousands of sites. Skilled persons will recognize that conference bridge equipment would be necessary to support the audio conference portion of a dataconference among large numbers of participants, due to attenuation produced by less sophisticated conference calling equipment and techniques.

With reference to FIG. 12, dataconferencing system 1200 links first, second, third, fourth, and fifth dataconferencing sites, 1201, 1202, 1203, 1204, and 1205, respectively, via independent voice and data networks 1210 and 1212. For simplicity, none of the data network connections 1220 between dataconferencing sites 1201–1205 and data network 1212 is indirect, as described with reference to FIG. 6. However, indirect connections, e.g., modem connections, comprising segments of data network 1212 are within the scope of the present invention. Similarly none of the connections of dataconferencing system 1200 is shown as a wireless connection. However, those skilled in the art will appreciate that wireless networking connections could easily be utilized at any of the sites 1201–1205 or in place of any of the data network connections 1220 of dataconferencing system 1200.

At first dataconferencing site 1201, a conventional speakerphone 1242 and a projector 1244 are connected to a first simplified dataconferencing appliance 1246 of the type described above with reference to FIGS. 3–9. Hardware and/or software of dataconferencing appliance 1246 comprise a network interface module, a dataconference control unit, and an image processing subsystem. Dataconferencing appliance 1246 is connected to voice network 1210 and separately to data network 1212.

At second dataconferencing site 1202, a network enabled projector 1252 includes a network interface module 1254 for communication with data network 1212. Projector 1252 is connected to a dataconferencing speakerphone appliance 1256 having an integrated dataconference control unit and speakerphone, which are connected to voice network 1210.

Third dataconferencing site 1203 includes only a speakerphone 1258 connected to voice network 1210 for participation in the audio portion of dataconferences but not the visual component of dataconferences.

At fourth dataconferencing site 1204, a computer workstation 1262 includes a display device 1264 and an image processing subsystem, along with optional presentation software for serving as an image source and for coordinating multisource presentations. A network interface module (not shown) of computer workstation 1262 connects computer workstation 1262 to data network 1212. Computer workstation 1262 is also connected to a simplified dataconferencing appliance 1268, which includes a dataconference control unit and a telephone adapter (not shown) in accordance with the present invention. Dataconferencing appliance 1268 is connected to voice network 1210 for exchanging network access codes with first, second, and fifth sites 1201, 1202, and 1205 via signaling within a voice call on voice network 1210. A telephone set 1270 is connected to dataconferencing appliance 1268 to allow a person at fourth site 1204 to participate in the audio component of dataconferences.

At fifth dataconferencing site 1205, a dataconferencing computer workstation 1280 includes a video display monitor 1282, a microphone 1284, and a loudspeaker 1286. Dataconferencing computer workstation 1280 includes a network interface module (not shown) for connection to data network 1212 and a sound card, a telephone adapter, or other hardware (not shown) for connection to voice network 1210. Software executing on dataconferencing computer workstation 1280 handles incoming and outgoing telephone calls and can perform all of the functions of a telephone receiver, a dataconferencing appliance, an image source, and an image processing subsystem within the scope of the present invention. In this respect, dataconferencing computer workstation 1280 is similar to fully integrated dataconferencing appliance 1111 of FIG. 11, except that the display device of dataconferencing computer workstation 1280 is video display monitor 1282 while the display device of fully integrated dataconferencing appliance 1111 is a projector.

A voice call session is established between the first, second, fourth, and fifth sites 1201, 1202, 1204, and 1205 and then a negotiation procedure is performed to distribute a network access code to the first, second, fourth, and fifth sites 1201, 1202, 1204, and 1205 in accordance with the dataconferencing methods described above. An audio-only connection to the dataconferencing session is established with third site 1203, which is not enabled to participate in the negotiation procedure.

Figure 13:
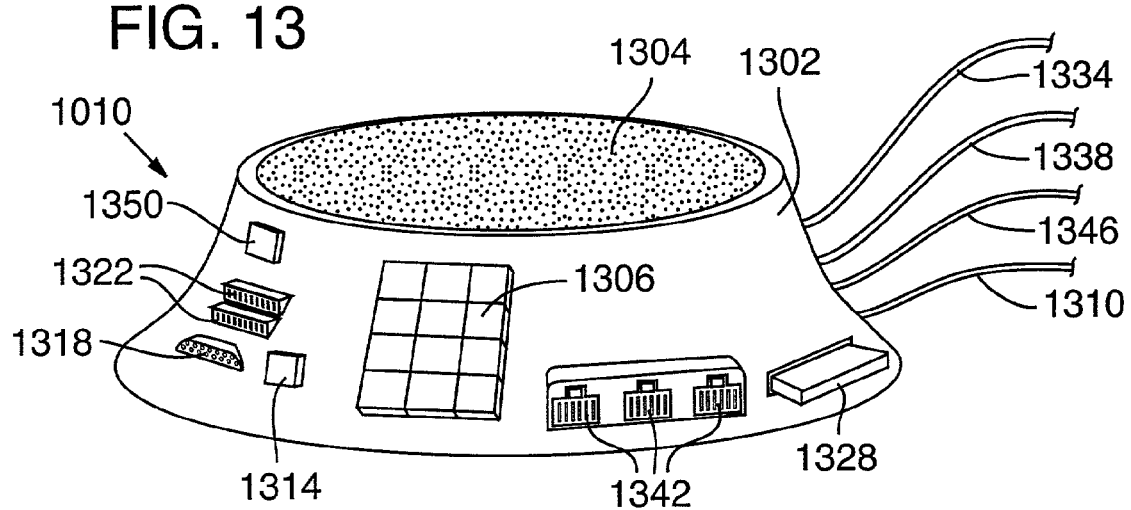
FIG. 13 is an enlarged pictorial view of the integrated dataconferencing speakerphone appliance of FIG. 10.

FIG. 13 is a pictorial view of the integrated dataconferencing speakerphone appliance 1010 of FIG. 10. With reference to FIG. 13, dataconferencing speakerphone appliance 1010 includes a housing 1302 that holds a speakerphone including a loudspeaker 1304 and a touchpad 1306 for dialing the speakerphone. A voice call is established on the voice network by dialing a telephone number of a remote site using touchpad 1306. A speakerphone ON/OFF button 1314 controls the on-hook or off-hook status of the speakerphone when initiating or ending a voice call session. Dataconferencing speakerphone appliance 1010 also includes an integrated network interface module, a dataconference control unit, and a telephone adapter (not shown) connected to a voice network via a telephone line 1310. In accordance with the methods of the present invention described above with reference to FIG. 2, the dataconference control unit includes a digital processor and other circuitry or software that is designed to control the telephone adapter for sending electronically generated audio signals within the voice call. Dataconferencing speakerphone appliance 1010 includes a PC-video-IN connector 1318 for connecting a video image source device such as a personal computer 1420 (FIG. 14); one or more USB slots 1322 for connecting peripheral devices such as keyboards, digitizing tablets, and image source devices; and, optionally, a wireless LAN card 1328 and a wireless input device receiver (not shown) for connecting, respectively, to a data network via a infrastructure wireless networking access point (not shown) and to an input device such as a wireless keyboard. A DVI or USB cable 1334 connects dataconferencing speakerphone appliance 1010 to a projector or other display device (not shown). An optional network cable 1338 connects the network interface module of dataconferencing speakerphone appliance 1010 to an external data network. One or more RJ-45 connectors 1342 are available for connecting an image source or other network-enabled devices to the data network. A power cable 1346 is connected to a 110-volt AC power supply or wall socket to supply power to dataconferencing speakerphone appliance 1010. Finally, a pushbutton 1350 is provided for activating the dataconference control unit to perform the access negotiation procedures and voice-call signaling methods in accordance with the present invention.

An additional benefit provided by dataconferencing speakerphone appliance 1010 is the convenient tabletop connectivity to display device(s) and to voice and data networks afforded by integrating the various connectors and cables into a single unit. Thus dataconferencing speakerphone appliance 1010 is useful as a convenient means of connecting a presenter's computer (or other image source) to the display device and/or the data network, even if dataconferencing functions are not utilized.

Figure 14:
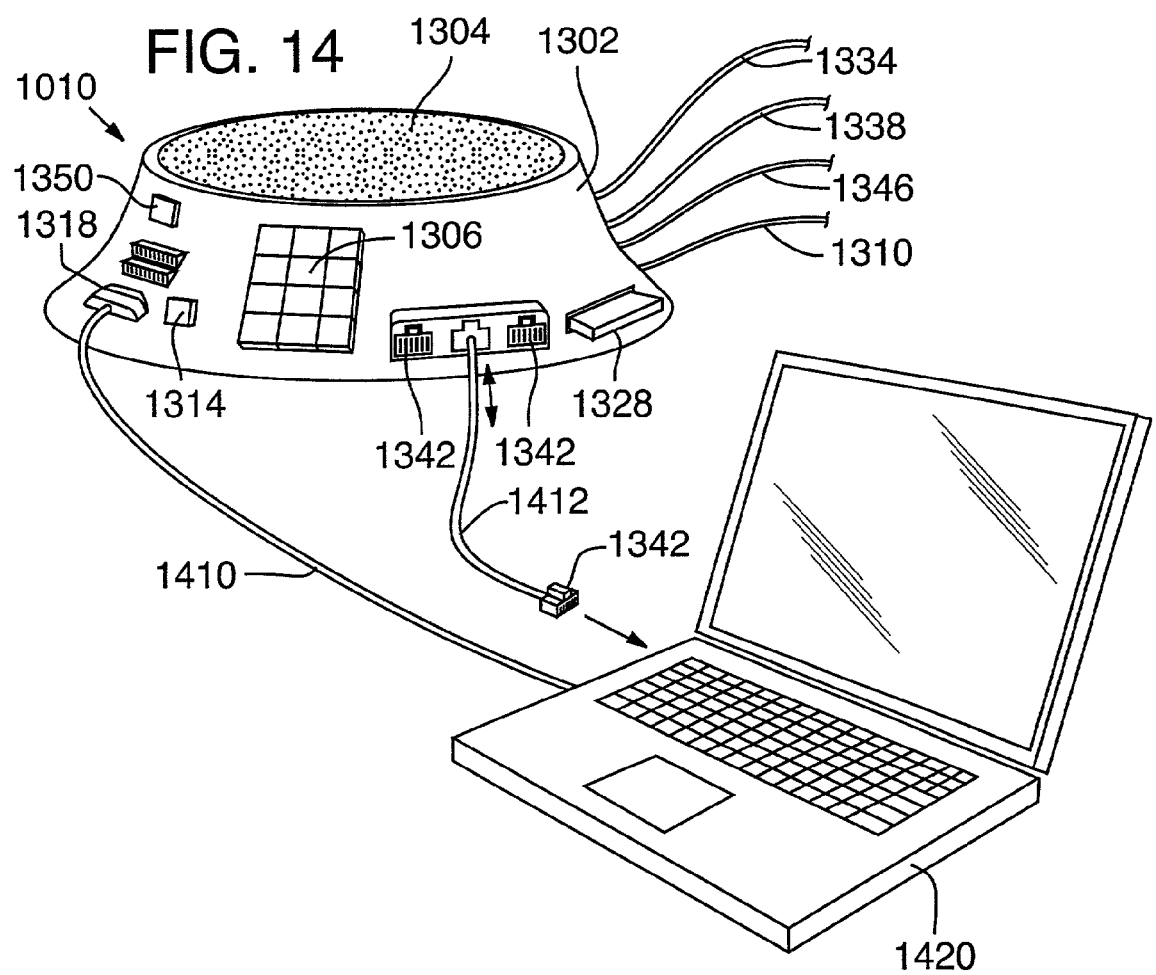
FIG. 14 is a pictorial view of the dataconferencing speakerphone appliance of FIG. 13 showing retractable network and peripheral cables being extended from the appliance for connection to a laptop computer.

FIG. 14 is a pictorial view the dataconferencing speakerphone appliance 1010 of FIG. 13 showing details of the appliance 1010. With reference to FIG. 14, RJ-45 connectors 1342 and PC-video-IN connector 1318 are attached to cables 1410, 1412 that retract within housing 1302 when not in use and extend from the dataconferencing speakerphone appliance 1010 when needed for connection to a computer 1420 or another network-enabled device or image source.

Figure 15:
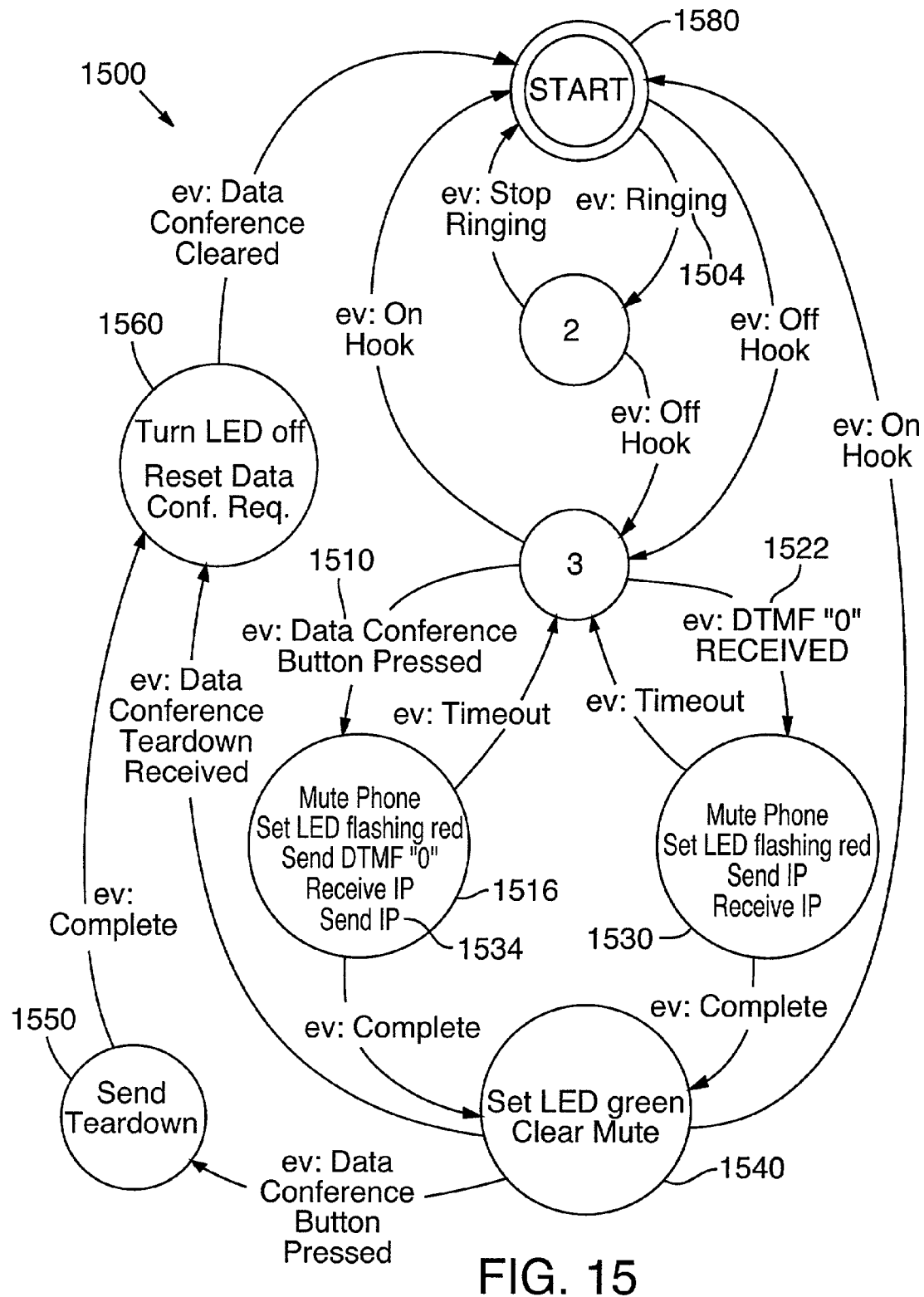
FIG. 15 is a state diagram depicting steps in an IP address exchange procedure of a dataconference control unit operating in accordance with an embodiment of the present invention.

FIG. 15 is a state diagram depicting steps in an embodiment of an address exchange procedure 1500 (negotiation procedure) of a dataconferencing appliance operating in accordance with the present invention. With reference to FIG. 15, the dataconferencing appliance emulates ringing (2) when a ring signal 1504 is received via the voice network, thereby causing an attached telephone receiver to ring. Once a voice call session is established (3), a pushbutton or other input key of the dataconferencing appliance is manually activated 1510 to cause the dataconferencing appliance to transmit a "0" DTMF tone and to listen for a reply 1516. Otherwise, the dataconferencing appliance listens for a "0" DTMF tone 1522. Assuming that a "0" DTMF tone is sent by the local dataconferencing appliance, then the remote dataconferencing appliance mutes its attached telephone receiver and replies with 12 DTMF tones representing its IPv4 decimal address 1530. Upon receipt of these 12 DTMF tones, the local dataconferencing appliance completes the exchange procedure by replying to the remote data conferencing unit with the 12 digit IPv4 decimal address of the local dataconferencing appliance, which is also represented by 12 DTMF tones 1534. Once the network addresses have been exchanged, an LED on dataconferencing appliance is lit to indicate that a data network session has been established 1540.

At any time after it is established, data network session can be terminated by activating the input key a second time to begin a teardown procedure, including transmission of a teardown signal 1550, either over the data network or within the voice call. Once teardown is complete, the LED is turned off 1560 and the dataconferencing appliance is reset to a ready state 1580. As will be understood by those skilled in the art, negotiation procedure 1500 may involve the transmission of only one rather than both IP addresses, for example when using multicast addressing, as described above with reference to FIG. 2. Furthermore, instead of using DTMF tones as described above with reference to FIG. 15, an alternative address exchange procedure (not shown) could use other types of electronically generated audio signals. Error checking and error correction could also be included in negotiation procedure 1500.

Figure 16:
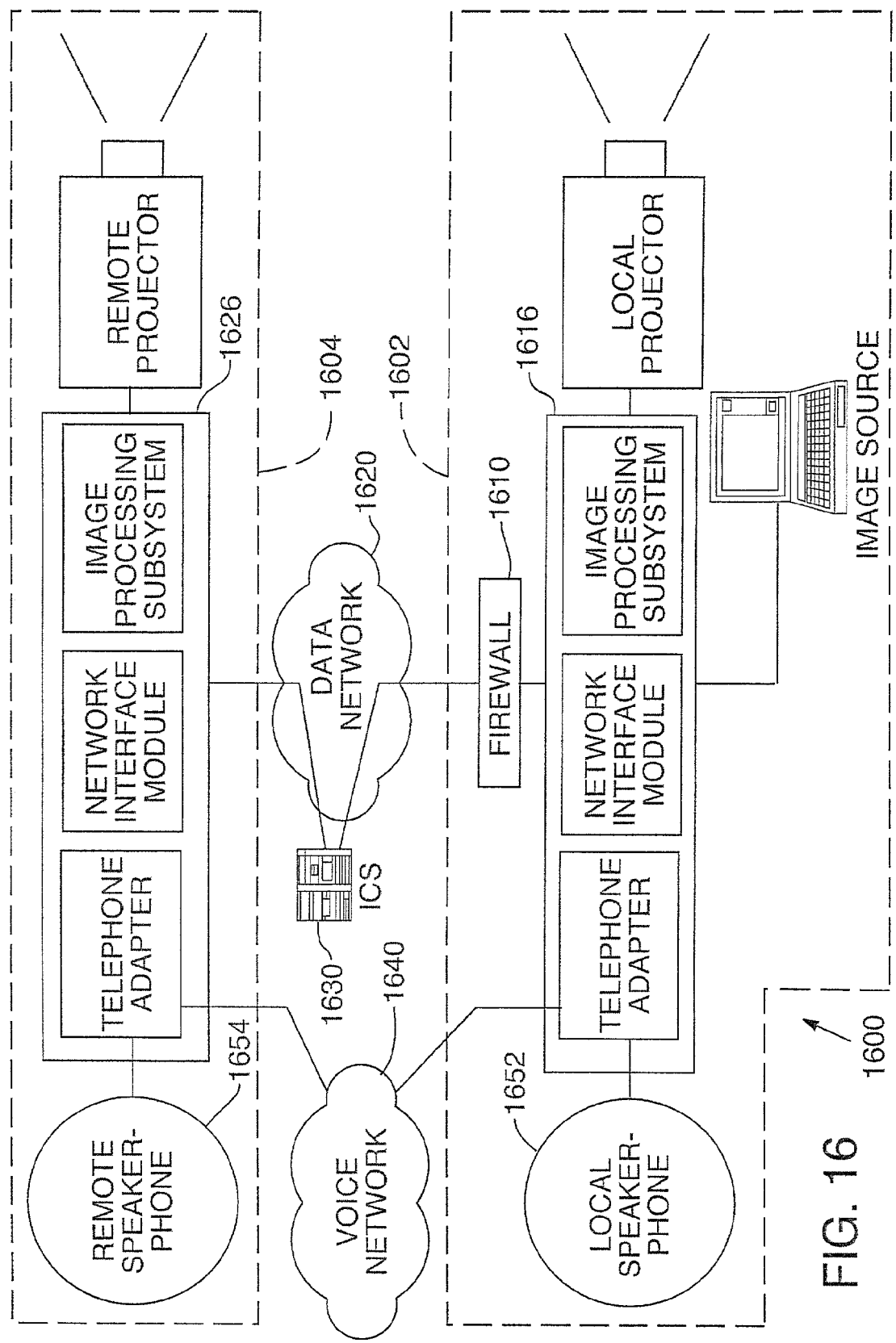
FIG. 16 is a block diagram of an alternative embodiment dataconferencing system including an Internet conference server for use of the invention with a computer network firewall.

FIG. 16 is a block diagram of an alternative embodiment dataconferencing system 1600 deploying the present invention across a computer network firewall. With reference to FIG. 16, dataconferencing system 1600 is organized for communication between a local site 1602 and a remote site 1604. Local site 1602 includes a firewall 1610, which is installed at local site 1602 between a local dataconferencing appliance 1616 and a data network 1620, which is external to local site 1602. Firewall 1610 acts as a gateway to prevent any unauthorized network traffic from entering a LAN at local site 1602 using methods known in the art. A remote dataconferencing appliance 1626 is located at remote site 1604 and may be identical to local dataconferencing appliance 1616 or configured differently. Although not shown in this alternative embodiment, the invention would work equally well if remote site 1604 were also behind a firewall. This embodiment could also be used for establishing a dataconferencing session between more than two sites.

To facilitate communications across firewall 1610, an Internet conference server ("ICS") 1630 is coupled to data network 1620 and made accessible to local and remote dataconferencing appliances 1616, 1626 via data network 1620. ICS 1630 serves as a repository for commands and data to be transferred over data network 1620 between local and remote sites 1602 and 1604. To ensure receipt of data and/or commands sent via ICS 1630, dataconferencing appliances 1616, 1626 may transmit electronically generated audio signals (not shown) over a voice network 1640 when data, images, or commands are waiting at ICS 1630 for pick-up by the other dataconferencing appliance. Alternatively, dataconferencing appliances 1616, 1626 may periodically poll ICS 1630 to determine whether new data or commands are available at ICS 1630. By causing the receiving site to actively seek information that is temporarily stored on ICS 1630, dataconferencing system 1600 of FIG. 16 avoids problems with sending data or commands behind firewall 1610, without requiring the use of multicast addressing.

Before activation, a network address of ICS 1630 is stored in memory on local dataconferencing appliance 1616. (In practice the network address of ICS 1630 is preferably stored on all dataconferencing appliances at the time of their manufacture.) To initiate a dataconferencing session, a participant at local site 1602 establishes a voice call between local and remote speakerphones 1652 and 1654 and manually activates local dataconferencing appliance 1616 to send a request to ICS 1630 via data network 1620. In response to the request from local dataconferencing appliance 1616, ICS 1630 launches a dataconferencing session process, allocates memory, assigns a dataconferencing session ID, and replies to local dataconferencing appliance 1616 with the session ID (or passcode) and an encryption key for secure communications. Because local dataconferencing appliance 1616 has requested a reply from ICS 1630, firewall 1610 will allow the reply to pass to local dataconferencing appliance 1616.

Upon receipt of the reply from ICS 1630, local dataconferencing appliance 1616 causes audio signals representing the session ID (passcode) to be transmitted via voice network 1640 within the voice call for receipt by remote dataconferencing appliance 1626. Using the passcode, remote dataconferencing appliance 1626 establishes secure communication with ICS 1630, which thereafter serves as a mailbox for exchanging data and/or commands between local and remote dataconferencing appliances 1616, 1626. Other than its ICS-related functions, dataconferencing system 1600 operates in the same manner as dataconferencing system 100 of FIG. 1 and using the method 200 described above with reference to FIG. 2.

It will be obvious to those having skill in the art that many changes may be made to the details of the above-described embodiments of this invention without departing from the underlying principles thereof. The scope of the present invention should, therefore, be determined only by the following claims.

The invention claimed is:

1. A dataconferencing appliance for use at a local site to facilitate a dataconferencing session between the local site and at least one geographically distant remote site, the local and remote sites being accessible via a shared voice call network and a shared data network, the remote site having a remote dataconferencing appliance connected to the voice call network and the data network, at least one of the local and remote sites having an image source for producing image data representative of an image, and the local site having a local display device for displaying the image at the local site, the dataconferencing appliance comprising:
   a telephone adapter for connecting a telephone receiver to the voice call network so that a voice call session can be established between the telephone receiver and the remote site via the voice call network, the telephone adapter including circuitry for monitoring the voice call session and for transmitting signals within the voice call session;
   a network interface for connecting the dataconferencing appliance to the data network;
   a dataconference control unit connected to the telephone adapter and the network interface, the dataconference control unit adapted for communication with the local display device, the dataconference control unit implementing a negotiation procedure that obtains a network access code and causes the telephone adapter to generate and transmit within the voice call session a signal representative of the network access code for receipt by the remote dataconferencing appliance,
   the dataconference control unit being responsive to receipt at the telephone adapter of a remote signal transmitted from the remote dataconferencing appliance within the voice call session, the remote signal representing a remote network access code, and to establish a data communication session, parallel to the voice call session, between the local and remote sites via the data network using the remote network access code, when received, thereby enabling image data to be transmitted between the local and remote sites over the data network for display via the local and remote display; and
   a housing adapted to incorporate the telephone adapter, the network interface, and the dataconference control unit into an integrated dataconferencing appliance.

2. The dataconferencing appliance of claim 1, further comprising a telephone receiver for establishing the voice call session between the local and remote sites.

3. The dataconferencing appliance of claim 1 in which the transmitting of the signal within the voice call session includes transmitting an electronically generated audio signal representative of the network access code.

4. The dataconferencing appliance of claim 3 in which the electronically generated audio signal includes a series of DTMF tones.

5. The dataconferencing appliance of claim 1, further comprising an input key that, when manually activated, initiates the negotiation procedure to transmit the network access code within the voice call session.

6. The dataconferencing appliance of claim 5 in which the input key must be manually activated to establish the data communication session.

7. The dataconferencing appliance of claim 5 in which the input key includes a pushbutton.

8. The dataconferencing appliance of claim 1, further comprising a speakerphone having a telephone keypad.

9. The dataconferencing appliance of claim 1, further comprising a display device.

10. The dataconferencing appliance of claim 1, further comprising a display device and a speakerphone.

11. The dataconferencing appliance of claim 1, further comprising:
    a housing; and
    at least one network cable terminating in a network connector, the network cable retractable within the housing when not in use.

12. The dataconferencing appliance of claim 1, further comprising a PC-video-IN connector for attaching an image source thereto.

13. The dataconferencing appliance of claim 1, further comprising a wireless networking module adapted for wireless communication between the dataconferencing appliance and a wireless device selected from the following group:
    (a) an image source;
    (b) a display device; and
    (c) an infrastructure wireless networking access point.

14. The dataconferencing appliance of claim 1, further comprising a USB connector for connecting the dataconferencing appliance to the local display device.

15. The dataconferencing appliance of claim 1, further comprising a DVI connector for connecting the dataconferencing appliance to the local display device.

16. The dataconferencing appliance of claim 1, further comprising a speakerphone and a speakerphone toggle switch for controlling an on-hook/off-hook status of the speakerphone.

17. The dataconferencing appliance of claim 1, further comprising an electronic projector.

18. The dataconferencing appliance of claim 1, further comprising an image processing subsystem for communication with the network interface, the image processing subsystem adapted to receive compressed image data and to decompress the compressed image data before display via the local display device.

19. A dataconferencing appliance for use at a local site to facilitate a dataconferencing session between the local site and at least one geographically distant remote site, the local and remote sites being accessible via a shared voice call network and a shared data network, the remote site having a remote dataconferencing appliance connected to the voice call network and the data network, at least one of the local and remote sites having an image source for producing image data representative of an image, and the local site having a local display device for displaying the image at the local site, the dataconferencing appliance comprising:

a telephone adapter for connecting a telephone receiver to the voice call network so that a voice call session can be established between the telephone receiver and the remote site via the voice call network, the telephone adapter including circuitry for monitoring the voice call session and for transmitting signals within the voice call session;

a network interface for connecting the dataconferencing appliance to the data network;

an image processing subsystem for communication with the network interface and the local display device, the image processing subsystem adapted to receive uncompressed image data and to compress the image data prior to transmission over the data network, the image processing subsystem further adapted to receive a compressed image data via the data network and to decompress the compressed image data before display via the local display device; and a dataconference control unit connected to the telephone adapter and the network interface, the dataconference control unit adapted for communication with the local display device, the dataconference control unit implementing a negotiation procedure that obtains a network access code and causes the telephone adapter to generate and transmit within the voice call session a signal representative of the network access code for receipt by the remote dataconferencing appliance, the dataconference control unit being responsive to receipt at the telephone adapter of a remote signal transmitted from the remote dataconferencing appliance within the voice call session, the remote signal representing a remote network access code, and to establish a data communication session between the local and remote sites via the data network using the remote network access code, when received, thereby enabling image data to be transmitted between the local and remote sites over the data network for display via the local and remote display devices.

20. A dataconferencing appliance for use at a local site to facilitate a dataconferencing session between the local site and at least one geographically distant remote site, the local and remote sites being accessible via a shared voice call network and a shared data network, the remote site having a remote dataconferencing appliance connected to the voice call network and the data network, at least one of the local and remote sites having an image source for producing image data representative of an image, and the local site having a local display device having a pixel resolution for displaying the image at the local site, the dataconferencing appliance comprising:

a telephone adapter for connecting a telephone receiver to the voice call network so that a voice call session can be established between the telephone receiver and the remote site via the voice call network, the telephone adapter including circuitry for monitoring the voice call session and for transmitting signals within the voice call session;

a network interface for connecting the dataconferencing appliance to the data network;

an image processing subsystem for communication with the local display device, the image processing subsystem adapted to receive image data and to resize the image data to fit the pixel resolution before display of the image via the local display; and a dataconference control unit connected to the telephone adapter and the network interface, the dataconference control unit adapted for communication with the local display device, the dataconference control unit implementing a negotiation procedure that obtains a network access code and causes the telephone adapter to generate and transmit within the voice call session a signal representative of the network access code for receipt by the remote dataconferencing appliance, the dataconference control unit being responsive to receipt at the telephone adapter of a remote signal transmitted from the remote dataconferencing appliance within the voice call session, the remote signal representing a remote network access code, and to establish a data communication session between the local and remote sites via the data network using the remote network access code, when received, thereby enabling image data to be transmitted between the local and remote sites over the data network for display via the local and remote display devices.

21. A distributed dataconferencing system for use with multiple sites at which a shared voice call network and a shared data network are accessible, each of the sites including a display device, comprising:

at each of the sites:
(a) a telephone receiver coupled to the voice call network for establishing a voice call session with the telephone receivers of other sites over the voice call network for transmission of voice communications therebetween,
(b) a network interface coupled to the data network,
(c) a dataconference control unit coupled to the voice call network, the dataconference control unit coupled to the network interface and the display device at said site; and
(d) a housing adapted to incorporate the network interface and the dataconference control unit into an integrated dataconferencing appliance;

at one or more of the sites, an input key coupled to the dataconference control unit;

a negotiation procedure implemented in the dataconference control units, the negotiation procedure responsive to manual actuation of the input key to obtain a network access code and transmit the network access code within the voice call session, and the negotiation procedure responsive to receipt of a received network access code via the voice call session, to thereby establish a data communication session, parallel to the voice call session, between the sites via the data network using one or both of the network access code and the received network access code; and at least one image source for producing image data representative of an image, the image source coupled to one of the network interfaces for transmitting the image data to the sites via the data network, to thereby facilitate display of the image at the sites via the display devices.

22. The system of claim 21, further comprising, at each of the sites: an image processing subsystem coupled to the network interface and the display device, the image processing subsystem adapted to receive image data, to compress the image data prior to transmission over the data network, and to decompress the compressed image data upon receipt of the compressed image data via the data network.

23. A distributed dataconferencing system for use with multiple sites at which a shared voice call network and a shared data network are accessible, each of the sites including a display device having a pixel resolution, comprising:

at each of the sites:

(a) a telephone receiver coupled to the voice call network for establishing a voice call session with the telephone receivers of other sites over the voice call network for transmission of voice communications therebetween,
(b) a network interface coupled to the data network, and
(c) a dataconference control unit coupled to the voice call network, the dataconference control unit coupled to the network interface and the display device at said site; and
(d) an image processing subsystem coupled to the network interface and the display device, the image processing subsystem adapted to receive image data and to resize the image data to fit the pixel resolution of the display device at said site before display of the image;

at one or more of the sites, an input key coupled to the dataconference control unit;

a negotiation procedure implemented in the dataconference control units, the negotiation procedure responsive to manual actuation of the input key to obtain a network access code and transmit the network access code within the voice call session, and the negotiation procedure responsive to receipt of a received network access code via the voice call session, to thereby establish a data communication session between the sites via the data network using one or both of the network access code and the received network access code; and at least one image source for producing image data representative of an image, the image source coupled to one of the network interfaces for transmitting the image data to the sites via the data network, to thereby facilitate display of the image at the sites via the display devices.

24. The system of claim 21 in which, at one or more of the sites, the dataconference control unit, the network interface, and the input key are integrated in a dataconferencing appliance.

25. The system of claim 24 in which the dataconferencing appliance includes an integrated speakerphone.

26. The system of claim 24 in which the dataconferencing appliance includes a wireless networking module.

27. The system of claim 21 in which the network interface at one or more of the sites includes a wireless networking module.

28. The system of claim 27 in which the wireless networking module is a short-range peer-to-peer wireless networking module.

29. A distributed dataconferencing system for use with multiple sites at which a shared voice call network and a shared data network are accessible, each of the sites including a display device, comprising:

at each of the sites:
(a) a telephone receiver coupled to the voice call network for establishing a voice call session with the telephone receivers of other sites over the voice call network for transmission of voice communications therebetween,
(b) a network interface coupled to the data network, and
(c) a dataconference control unit coupled to the voice call network, the dataconference control unit coupled to the network interface and the display device at said site; and
(d) a telephone adapter connecting the telephone receiver and the dataconference control unit to an incoming telephone line of the voice call network, the telephone adapter configured to monitor the status of the incoming telephone line and report status information to the dataconference control unit, at one or more of the sites, an input key coupled to the dataconference control unit;

a negotiation procedure implemented in the dataconference control units, the negotiation procedure responsive to manual actuation of the input key to obtain a network access code and transmit the network access code within the voice call session, and the negotiation procedure responsive to receipt of a received network access code via the voice call session, to thereby establish a data communication session between the sites via the data network using one or both of the network access code and the received network access code, the negotiation procedure of the dataconference control unit causing control signals to be issued from the dataconference control unit to the telephone adapter in response to manual activation of the input key, the control signals directing the telephone adapter to transmit within the voice call one or more electronically generated audio signals representing the network access code; and at least one image source for producing image data representative of an image, the image source coupled to one of the network interfaces for transmitting the image data to the sites via the data network, to thereby facilitate display of the image at the sites via the display devices.

30. The system of claim 21, further comprising an Internet conference server accessible on the data network at an IP address, and in which the network access code transmitted within the voice call session includes the IP address.

31. The system of claim 21 in which the network access code transmitted within the voice call session includes a multicast group address.

32. The system of claim 21 in which the image source includes multiple image sources that generate a plurality of images, the image sources coupled to one or more of the network interfaces.

33. The system of claim 21 in which the network interface, display device, and dataconference control unit are integrated in a computer workstation at one or more of the sites.

34. The system of claim 33 in which the computer workstation includes the image source.

35. A dataconferencing system for use with a voice call network and a data network accessible at first and second sites, comprising:
a first display device located at the first site;
a first integrated dataconferencing appliance coupled to the voice call network, the data network, and the first display device at the first site;
a second display device located at the second site;
a second integrated dataconferencing appliance coupled to the voice call network, the data network, and the second display device at the second site; and
an image source coupled to one of the first and second dataconferencing appliances,
each of the first and second dataconferencing appliances implementing a negotiation procedure for obtaining a network access code, transmitting to the other dataconferencing appliance the network access code over the voice call network, and establishing a data communication session, parallel to the voice call session, between the dataconferencing appliances via the data network using the network access code.

36. The system of claim 35 in which the image source is adapted to produce image data representative of an image, the first and second dataconferencing appliances are adapted to transmit the image data between the first and second sites over the data network, and further comprising:
- a first image processing subsystem for communication with the first display device; and
- a second image processing subsystem for communication with and the second display device,
- the first and second image processing subsystems adapted to receive the image data, to compress the image data prior to transmission over the data network, and to decompress the compressed image data upon receipt of the compressed image data via the data network.

37. The system of claim 35 in which the first and second display devices each has a pixel resolution, and further comprising:
- a first image processing subsystem for communication with the first display device; and
- a second image processing subsystem for communication with the first display device,
- the first and second image processing subsystems adapted to receive the image data and to resize the image data to fit the pixel resolution of the respective first and second display devices.

38. The system of claim 35 in which at least one of the dataconferencing appliances includes an integrated speakerphone.

39. The system of claim 35 in which at least one of the dataconferencing appliances includes a wireless networking module.

40. The system of claim 39 in which the wireless networking module is a short-range peer-to-peer wireless networking module.

41. A dataconferencing system for use with a voice call network and a data network accessible at first and second sites, comprising:
- a first display device located at the first site;
- a first dataconferencing appliance coupled to the voice call network, the data network, and the first display device at the first site;
- a second display device located at the second site;
- a second dataconferencing appliance coupled to the voice call network, the data network, and the second display device at the second site; and
- an image source coupled to one of the first and second dataconferencing appliances,
- each of the first and second dataconferencing appliances implementing a negotiation procedure for obtaining a network access code, transmitting to the other dataconferencing appliance the network access code over the voice call network, and establishing a data communication session between the dataconferencing appliances via the data network using the network access code,
- each of the first and second dataconferencing appliances including a dataconference control unit and a telephone adapter connecting the dataconference control unit to an incoming telephone line of the voice call network, the telephone adapter configured to monitor the status of the incoming telephone line and report status information to the dataconference control unit,
- the negotiation procedure of the dataconferencing apparatus causing control signals to be issued from the dataconference control unit to the telephone adapter, the control signals directing the telephone adapter to transmit within the voice call one or more electronically generated audio signals representing the network access code.

42. The system of claim 35 in which each of the first and second dataconferencing appliances includes a dataconference control unit for executing the negotiation procedure and a network interface connecting the dataconference control unit and the image source to the data network.

43. The system of claim 35 in which each of the first and second display devices includes a network interface for connecting the display device to the dataconferencing appliance via the data network.

44. The system of claim 35, further comprising an Internet conference server accessible on the data network at an IP address, and in which the network access code transmitted over the voice call network includes the IP address.

45. The system of claim 35 in which the network access code transmitted over the voice call network includes a multicast group address.

46. The system of claim 35 in which the image source includes multiple image sources that generate a plurality of images, the image sources coupled to one or more of the dataconferencing appliances.

47. The system of claim 35 in which the first dataconferencing appliance and the first display device are integrated in a computer workstation.

48. The system of claim 47 in which the computer workstation includes the image source.

* * * * *